(12) United States Patent
Liao et al.

(10) Patent No.: US 9,488,807 B2
(45) Date of Patent: Nov. 8, 2016

(54) OPTICAL IMAGING LENS ASSEMBLY, IMAGE CAPTURING UNIT AND ELECTRONIC DEVICE

(71) Applicant: LARGAN Precision Co., Ltd., Taichung (TW)

(72) Inventors: Lin-Yao Liao, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 18 days.

(21) Appl. No.: 14/596,982

(22) Filed: Jan. 14, 2015

(65) Prior Publication Data
US 2016/0170176 A1    Jun. 16, 2016

(30) Foreign Application Priority Data
Dec. 10, 2014 (TW) .............................. 103143058 A

(51) Int. Cl.
| | |
|---|---|
| G02B 13/18 | (2006.01) |
| G02B 9/60 | (2006.01) |
| G02B 13/00 | (2006.01) |
| H04N 5/225 | (2006.01) |

(52) U.S. Cl.
CPC ....... *G02B 13/0045* (2013.01); *G02B 13/0015* (2013.01); *G02B 13/18* (2013.01); *H04N 5/2254* (2013.01)

(58) Field of Classification Search
CPC .............................. G02B 9/60; G02B 13/0045
USPC .......................... 359/714, 753, 763, 764, 767
See application file for complete search history.

(56) References Cited

U.S. PATENT DOCUMENTS

| | | | |
|---|---|---|---|
| 8,179,618 B2 | 5/2012 | Baba | |
| 8,537,472 B2 | 9/2013 | Tsai et al. | |
| 8,649,115 B2 | 2/2014 | Chen et al. | |
| 8,780,459 B2 | 7/2014 | Chen et al. | |
| 2015/0097106 A1* | 4/2015 | Yu ...................... | G02B 13/0045 250/208.1 |

FOREIGN PATENT DOCUMENTS

| | | |
|---|---|---|
| JP | 2010145648 A | 7/2010 |
| TW | 201409070 A | 3/2014 |
| TW | 201514530 A | 4/2015 |

OTHER PUBLICATIONS

Intellectual Property Office, Ministry of Economic Affairs, R. O. C, "Office Action", Aug. 6, 2015, Taiwan.

* cited by examiner

*Primary Examiner* — William Choi
(74) *Attorney, Agent, or Firm* — Maschoff Brennan

(57) ABSTRACT

An optical imaging lens assembly includes, in order from an object side to an image side, a first lens element, a second lens element, a third lens element, a fourth lens element and a fifth lens element. The first lens element with positive refractive power has an object-side surface being convex in a paraxial region thereof. The second lens element with positive refractive power has an object-side surface being convex in a paraxial region thereof. The third lens element has refractive power. The fourth lens element with positive refractive power has an object-side surface being convex and an image-side surface being convex in a paraxial region thereof. The fifth lens element with negative refractive power has an object-side surface being concave and an image-side surface being concave in a paraxial region thereof, wherein the image-side surface thereof has at least one convex shape in an off-axis region thereof.

27 Claims, 21 Drawing Sheets

OPTICAL IMAGING LENS ASSEMBLY, IMAGE CAPTURING UNIT AND ELECTRONIC DEVICE

RELATED APPLICATIONS

This application claims priority to Taiwan Application 103143058, filed Dec. 10, 2014, which is incorporated by reference herein in its entirety.

BACKGROUND

1. Technical Field

The present disclosure relates to an optical imaging lens assembly, an image capturing unit and an electronic device, more particularly to an optical imaging lens assembly and an image capturing unit applicable to an electronic device.

2. Description of Related Art

In recent years, with the popularity of electronic devices having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Other conventional compact optical systems with five-element lens structure are developed to enhance resolution and image quality. However, the refractive power of the optical system is not evenly distributed so as to overly enlarge the incident angle of the light, thereby it is unfavorable for avoiding stray light at the peripheral region and reducing a back focal length of the optical system to keep in a compact size. Furthermore, the refractive power is overly concentrated on a single lens element, and therefore it is unfavorable for reducing the sensitivity of the optical system.

SUMMARY

According to one aspect of the present disclosure, an optical imaging lens assembly includes, in order from an object side to an image side, a first lens element, a second lens element, a third lens element, a fourth lens element and a fifth lens element. The first lens element with positive refractive power has an object-side surface being convex in a paraxial region thereof. The second lens element with positive refractive power has an object-side surface being convex in a paraxial region thereof. The third lens element has refractive power. The fourth lens element with positive refractive power has an object-side surface being convex in a paraxial region thereof and an image-side surface being convex in a paraxial region thereof, wherein both of the object-side surface and the image-side surface of the fourth lens element are aspheric. The fifth lens element with negative refractive power has an object-side surface being concave in a paraxial region thereof and an image-side surface being concave in a paraxial region thereof, wherein the image-side surface of the fifth lens element has at least one convex shape in an off-axis region thereof, and both of the object-side surface and the image-side surface of the fifth lens element are aspheric. The optical imaging lens assembly has a total of five lens elements with refractive power. An air gap in a paraxial region is between every two of the first lens element, the second lens element, the third lens element, the fourth lens element and the fifth lens element that are adjacent to each other. When a focal length of the optical imaging lens assembly is f, a focal length of the first lens element is f1, a focal length of the second lens element is f2, a curvature radius of the object-side surface of the fourth lens element is R7, a curvature radius of the image-side surface of the fourth lens element is R8, the following conditions are satisfied:

$0 < f1/f2 < 2.0$; and $-3.0 < (f/R7) + (f/R8)$.

According to another aspect of the present disclosure, an optical imaging lens assembly includes, in order from an object side to an image side, a first lens element, a second lens element, a third lens element, a fourth lens element and a fifth lens element. The first lens element with positive refractive power has an object-side surface being convex in a paraxial region thereof. The second lens element with positive refractive power has an object-side surface being convex in a paraxial region thereof. The third lens element has refractive power. The fourth lens element with positive refractive power has an object-side surface being convex in a paraxial region thereof and an image-side surface being convex in a paraxial region thereof, wherein both of the object-side surface and the image-side surface of the fourth lens element are aspheric. The fifth lens element with negative refractive power has an object-side surface being concave in a paraxial region thereof and an image-side surface being concave in a paraxial region thereof, wherein the image-side surface of the fifth lens element has at least one convex shape in an off-axis region thereof, and both of the object-side surface and the image-side surface of the fifth lens element are aspheric. The optical imaging lens assembly has a total of five lens elements with refractive power. An air gap in a paraxial region is between every two of the first lens element, the second lens element, the third lens element, the fourth lens element and the fifth lens element that are adjacent to each other. When a focal length of the first lens element is f1, a focal length of the second lens element is f2, the following condition is satisfied:

$0 < f1/f2 < 1.5$.

According to still another aspect of the present disclosure, an optical imaging lens assembly includes, in order from an object side to an image side, a first lens element, a second lens element, a third lens element, a fourth lens element and a fifth lens element. The first lens element with positive refractive power has an object-side surface being convex in a paraxial region thereof. The second lens element with positive refractive power has an object-side surface being convex in a paraxial region thereof. The third lens element has refractive power. The fourth lens element with positive refractive power has an object-side surface being convex in a paraxial region thereof and an image-side surface being convex in a paraxial region thereof, wherein both of the object-side surface and the image-side surface of the fourth lens element are aspheric. The fifth lens element with negative refractive power has an object-side surface being concave in a paraxial region thereof and an image-side surface being concave in a paraxial region thereof, wherein the image-side surface of the fifth lens element has at least one convex shape in an off-axis region thereof, and both of the object-side surface and the image-side surface of the fifth lens element are aspheric. The optical imaging lens assembly has a total of five lens elements with refractive power. An air gap in a paraxial region is between every two of the first lens element, the second lens element, the third lens element, the fourth lens element and the fifth lens element that are adjacent to each other. The optical imaging lens assembly further comprises at least one transparent flat panel located between the image-side surface of the fifth lens element and an image surface. When a focal length of the first lens element is f1, a focal length of the second lens element is f2, a sum of at least one central thickness of the at least one transparent flat panel is FPCT, the following conditions are satisfied:

0<f1/f2<1.5; and

FPCT≤0.275 mm.

According to yet another aspect of the present disclosure, an image capturing unit includes the optical imaging lens assembly according to the aforementioned aspect and an image sensor, wherein the image sensor is disposed on the image side of the optical imaging lens assembly.

According to still yet another aspect of the present disclosure, an electronic device includes the image capturing unit according to the aforementioned aspect.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
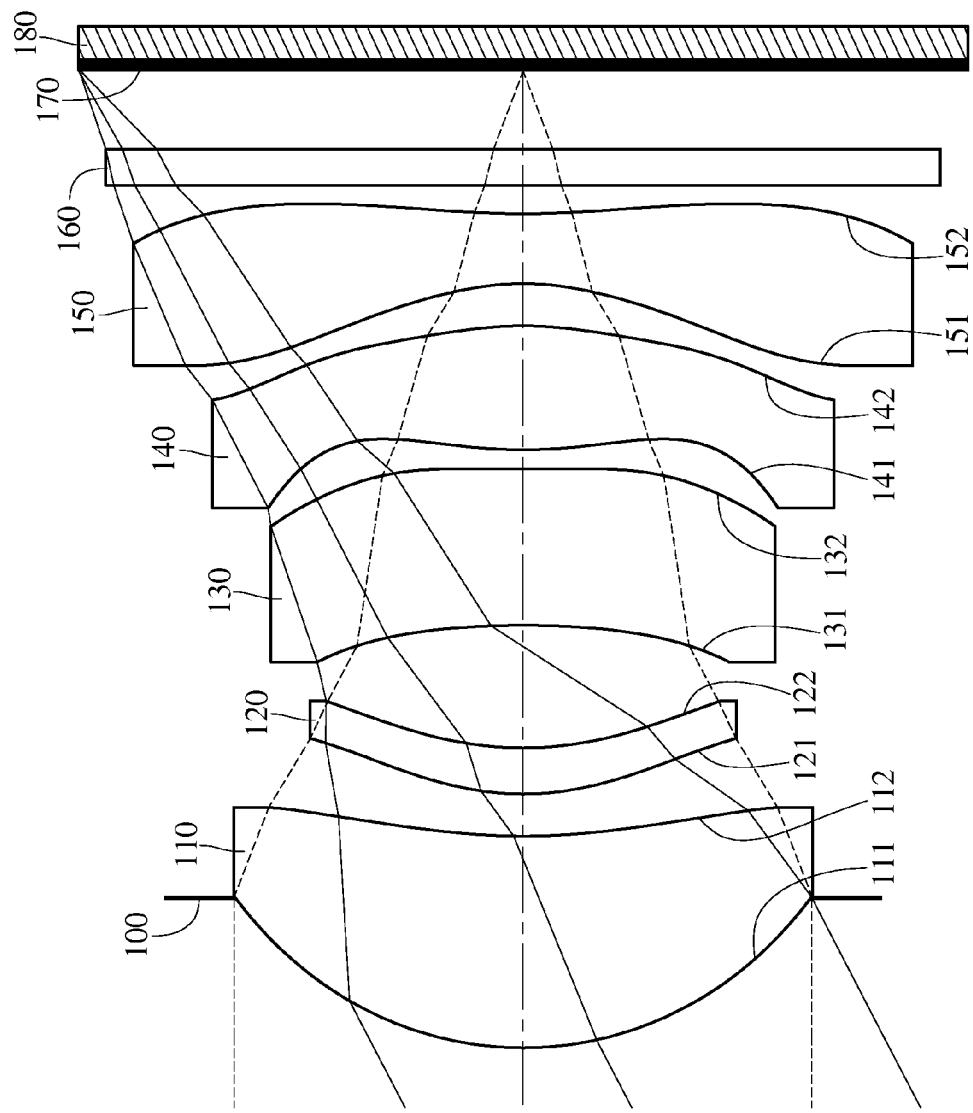
FIG. 1 is a schematic view of an image capturing unit according to the 1st embodiment of the present disclosure.

An optical imaging lens assembly includes, in order from an object side to an image side, a first lens element, a second lens element, a third lens element, a fourth lens element and a fifth lens element. The optical imaging lens assembly has a total of five lens elements with refractive power.

According to the optical imaging lens assembly of the present disclosure, an air gap in a paraxial region is arranged between every two of the first lens element, the second lens element, the third lens element, the fourth lens element and the fifth lens element that are adjacent to each other, that is, each of the first through fifth lens elements of the optical imaging lens assembly is a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality of the optical imaging lens assembly. Therefore, there is an air gap in a paraxial region between every two of the first lens element, the second lens element, the third lens element, the fourth lens element and the fifth lens element that are adjacent to each other in the present disclosure for solving the problem generated by the cemented lens elements.

The first lens element with positive refractive power has an object-side surface being convex in a paraxial region thereof. Therefore, the first lens element provides the optical imaging lens assembly with sufficient positive refractive power. Furthermore, it is favorable for adjusting a total track length of the optical imaging lens assembly.

The second lens element with positive refractive power has an object-side surface being convex in a paraxial region thereof. Therefore, both of the first lens element and the second lens element have positive refractive powers so that it is favorable for evenly distributing the light gathering capability of the optical imaging lens assembly so as to reduce the incident angle of the light, thereby avoiding stray light at the peripheral region of the image. Furthermore, it is favorable for reducing the back focal length of the optical imaging lens assembly so as to keep the optical imaging lens assembly compact.

The third lens element can have positive or negative refractive power accordingly. Therefore, it is favorable for correcting the aberration from the first lens element and the second lens element. Furthermore, it is favorable for reducing the sensitivity of the optical imaging lens assembly.

The fourth lens element with positive refractive power has an object-side surface being convex in a paraxial region thereof and an image-side surface being convex in a paraxial region thereof. The object-side surface of the fourth lens element can have at least one inflection point. Therefore, it is favorable for avoiding surface reflection problem caused by excessive change of shape thereof. Furthermore, it is favorable for effectively correcting the spherical aberration of the optical imaging lens assembly and the aberration of the off-axis thereof.

The fifth lens element with negative refractive power has an object-side surface being concave in a paraxial region thereof and an image-side surface being concave in a paraxial region thereof. The image-side surface of the fifth lens element has at least one convex shape in an off-axis region thereof. Therefore, it is favorable with the principal point of the optical imaging lens assembly being positioned away from the image side of the optical imaging lens assembly for reducing the back focal length of the optical imaging lens assembly, thereby keeping a compact size thereof. Furthermore, it is favorable for improving the image-sensing efficiency of the image sensor and further correcting the aberration of the off-axis by effectively reducing the incident angle of the light projecting onto the image sensor.

When a focal length of the first lens element is f1, a focal length of the second lens element is f2, the following condition is satisfied: $0<f1/f2<2.0$. Therefore, it is favorable for providing the second lens element with proper positive refractive power so as to effectively distribute the refractive power of the first lens element and avoid overloading the refractive power on a single lens element, thereby effectively reducing the sensitivity of the optical imaging lens assembly. Preferably, the following condition is satisfied: $0<f1/f2<1.5$.

When a focal length of the optical imaging lens assembly is f, a curvature radius of the object-side surface of the fourth lens element is R7, a curvature radius of the image-side surface of the fourth lens element is R8, the following condition is satisfied: $-3.0<(f/R7)+(f/R8)$. Therefore, it is favorable for avoiding surface reflection problem caused by excessive change of shape of the fourth lens element and reducing the molding problems. Preferably, the following condition is satisfied: $-2.0<(f/R7)+(f/R8)$. More preferably, the following condition is satisfied: $-1.65<(f/R7)+(f/R8)$. Much more preferably, the following condition is satisfied: $-1.5<(f/R7)+(f/R8)<-0.25$.

The optical imaging lens assembly can includes at least one transparent flat panel. The transparent flat panel is, for example, a filter, an IR-cut filter or a cover glass. When the at least one transparent flat panel is located between the image-side surface of the fifth lens element and an image surface, a sum of at least one central thickness of the at least one transparent flat panel is FPCT, the following condition is satisfied: $FPCT \leq 0.275$ mm. Therefore, it is favorable for avoiding the interference from unnecessary incident light and keeping the optical imaging lens assembly compact.

When a curvature radius of the object-side surface of the second lens element is R3, a curvature radius of an image-side surface of the second lens element is R4, the following condition can be satisfied: $8.0<|(R3+R4)/(R3-R4)|$. Therefore, it is favorable for correcting the astigmatism of the optical imaging lens assembly so as to improve the image quality.

When an entrance pupil diameter of the optical imaging lens assembly is EPD, a central thickness of the second lens element is CT2, the following condition can be satisfied: $8.0<EPD/CT2$. Therefore, it is favorable for providing sufficient amount of incident light and avoiding the restriction of diffraction limit so as to enhance the resolution of the optical imaging lens assembly.

When the focal length of the first lens element is f1, a focal length of the fourth lens element is f4, a focal length of the fifth lens element is f5, the following condition can be satisfied: $(|f4|+|f5|)/|f1|<1.25$. Therefore, it is favorable for balancing the arrangement of the refractive power of the optical imaging lens assembly so as to avoid excessive aberration and reduce the sensitivity of the optical imaging lens assembly. Preferably, the following condition is satisfied: $(|f4|+|f5|)/|f1|<1.0$.

When the central thickness of the second lens element is CT2, a central thickness of the third lens element is CT3, the following condition can be satisfied: $2.0<CT3/CT2$. Therefore, it is favorable for molding the lens elements and improving the aberration correction capability of the third lens element.

When an Abbe number of the second lens element is V2, the following condition can be satisfied: $V2<30$. Therefore, it is favorable for correcting the chromatic aberration of the optical imaging lens assembly.

When a central thickness of the first lens element is CT1, the central thickness of the second lens element is CT2, a central thickness of the fourth lens element is CT4, a central thickness of the fifth lens element is CT5, the following condition can be satisfied: $0.85<CT1/(CT2+CT4+CT5)<1.25$. Therefore, the thicknesses of the lens elements are properly arranged so as to be more homogeneous.

When an f-number of the optical imaging lens assembly is Fno, the following condition can be satisfied: $Fno<1.75$. Therefore, it is favorable for receiving sufficient incoming light so as to increase the image quality while the optical imaging lens assembly is in a low light condition with a shutter at a high speed.

When an axial distance between the image-side surface of the fifth lens element and the image surface is BL, an axial distance between the object-side surface of the first lens element and the image surface is TL, the following condition can be satisfied: $BL/TL<0.18$. Therefore, it is favorable for reducing the back focal length of the optical imaging lens assembly so as to maintain proper total track length thereof.

According to the disclosure, the optical imaging lens assembly can be operated within a wavelength range of 750 nanometers (nm) to 1050 nm. Therefore, it is favorable for effectively capturing the images within infrared spectrum so as to be applied to motion sensing and low-light photography.

When the axial distance between the object-side surface of the first lens element and the image surface is TL, the entrance pupil diameter of the optical imaging lens assembly is EPD, the following condition can be satisfied: $TL/EPD<2.0$. Therefore, it is favorable for providing sufficient amount of incident light so as to enhance the resolution in the low light condition.

According to the optical imaging lens assembly of the present disclosure, an aperture stop can be configured as a front stop or a middle stop. A front stop disposed between an imaged object and the first lens element can provide a longer distance between an exit pupil of the optical imaging lens assembly and the image surface with a telecentric configuration and thereby improves the image-sensing efficiency of an image sensor (for example, CCD or CMOS). A middle stop disposed between the first lens element and the image surface is favorable for enlarging the view angle of the optical imaging lens assembly and thereby provides a wider field of view for the same.

According to the optical imaging lens assembly of the present disclosure, the lens elements thereof can be made of glass or plastic material. When the lens elements are made of glass material, the distribution of the refractive power of the optical imaging lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the optical imaging lens assembly can also be reduced.

According to the optical imaging lens assembly of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the optical imaging lens assembly of the present disclosure, an image surface of the optical imaging lens assembly, based on the corresponding image sensor, can be flat or curved, especially a curved surface being concave facing towards the object side of the optical imaging lens assembly.

According to the optical imaging lens assembly of the present disclosure, the optical imaging lens assembly can include at least one stop, such as an aperture stop, a glare stop or a field stop. Said glare stop or said field stop is set for eliminating the stray light and thereby improving the image quality thereof.

According to the optical imaging lens assembly of the present disclosure, the at least one transparent flat panel can be located between the fifth lens element and the image surface. When the at least one transparent flat panel is located between the fifth lens element and the image surface, the axial distance between the image-side surface of the fifth lens element and the image surface (BL) includes the sum of the at least one central thickness of the at least one transparent flat panel (FPCT), and the axial distance between the object-side surface of the first lens element and the image surface (TL) also includes the sum of central thicknesses of the at least one transparent flat panel (FPCT).

According to the present disclosure, an image capturing unit is provided. The image capturing unit includes the optical imaging lens assembly according to the aforementioned optical imaging lens assembly of the present disclosure, and an image sensor, wherein the image sensor is disposed on the image side of the aforementioned optical imaging lens assembly, that is, the image sensor can be disposed on or near an image surface of the aforementioned optical imaging lens assembly. In some embodiments, the image capturing unit can further include a barrel member, a holding member or a combination thereof.

Figure 22:
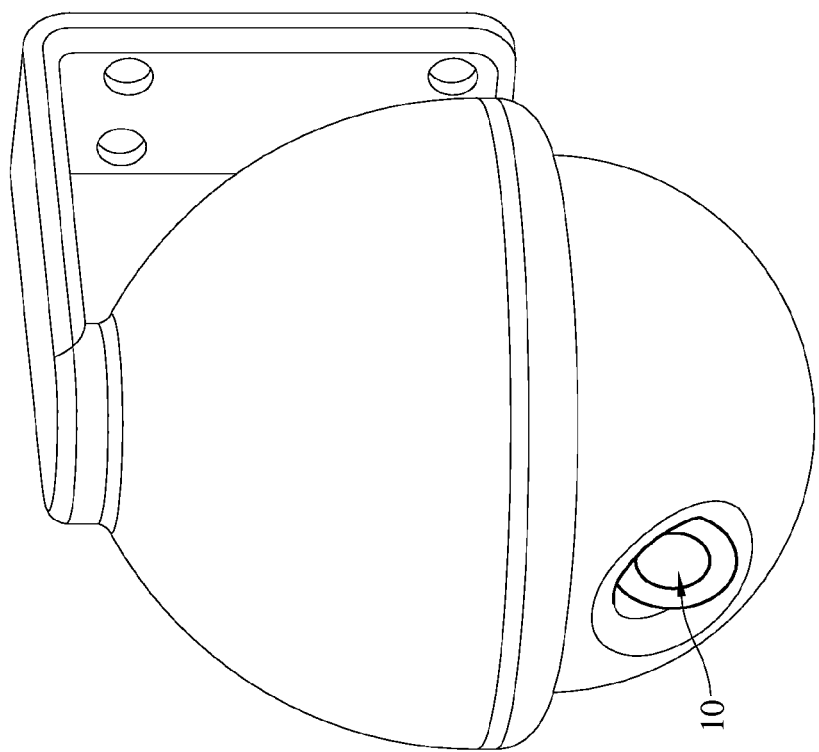
FIG. 22 shows an electronic device according to yet still another embodiment.

In FIG. 19, FIG. 20, FIG. 21 and FIG. 22, an image capturing device 10 may be installed in, but not limited to, an electronic device, including a smart phone (FIG. 19), a tablet personal computer (FIG. 20), a wearable device (FIG. 21) or an infrared camera (FIG. 22). The four exemplary figures of different kinds of electronic device are only exemplary for showing the image capturing device of present disclosure installing in an electronic device and is not limited thereto. In some embodiments, the electronic device can further include, but not limited to, a display unit, a control unit, a storage unit, a random access memory unit (RAM), a read only memory unit (ROM) or a combination thereof.

According to the optical imaging lens assembly of the present disclosure, the optical imaging lens assembly can be optionally applied to optical systems with a movable focus. Furthermore, the optical imaging lens assembly is featured with good capability in the correction of aberration and high image quality, and can be applied to 3D (three-dimensional) image capturing applications, in products such as digital cameras, mobile devices, digital tablets, wearable devices, smart televisions, wireless monitoring devices, motion sensing input devices, driving recorders, rear view cameras and other electronic imaging devices. The optical imaging lens assembly can also be applied to infrared image capturing applications such as motion sensing and low-light photography. In detail, the optical imaging lens assembly can be operated within a wavelength range of 750 nm to 1050 nm, but the disclosure does not limited thereto. According to the above description of the present disclosure, the following specific embodiments are provided for further explanation.

1st Embodiment

Figure 2:
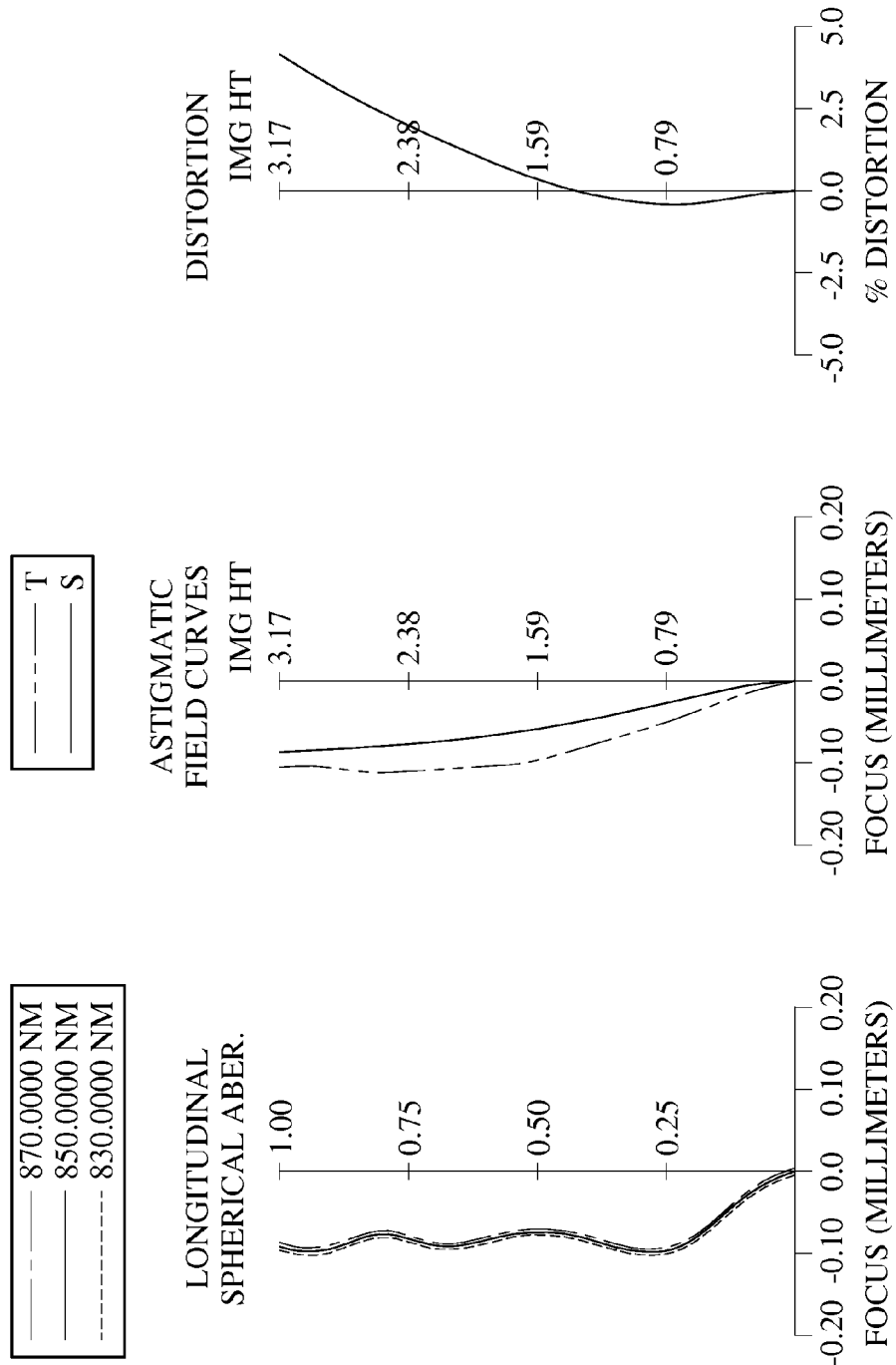
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging lens assembly (its reference numeral is omitted) of the present disclosure and an image sensor 180. The optical imaging lens assembly includes, in order from an object side to an image side, an aperture stop 100, a first lens element 110, a second lens element 120, a third lens element 130, a fourth lens element 140, a fifth lens element 150, a filter 160 and an image surface 170, wherein the optical imaging lens assembly has a total of five non-cemented lens elements (110-150) with refractive power. There is an air gap in a paraxial region between every two of the first lens element 110, the second lens element 120, the third lens element 130, the fourth lens element 140 and the fifth lens element 150 that are adjacent to each other.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with positive refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power has an object-side surface 131 being concave in a paraxial region thereof and an image-side surface 132 being concave in a paraxial region thereof. The third lens element 130 is made of plastic material and has the object-side surface 131 and the image-side surface 132 being both aspheric.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric. The object-side surface 141 of the fourth lens element 140 has at least one inflection point in an off-axis region thereof.

The fifth lens element 150 with negative refractive power has an object-side surface 151 being concave in a paraxial region thereof and an image-side surface 152 being concave in a paraxial region thereof. The fifth lens element 150 is made of plastic material and has the object-side surface 151 and the image-side surface 152 being both aspheric. The image-side surface 152 of the fifth lens element 150 has at least one convex shape in an off-axis region thereof.

The filter 160 is made of glass and located between the fifth lens element 150 and the image surface 170, and will not affect the focal length of the optical imaging lens assembly. The image sensor 180 is disposed on or near the image surface 170 of the optical imaging lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical imaging lens assembly of the image capturing unit according to the 1st embodiment, when a focal length of the optical imaging lens assembly is f, an f-number of the optical imaging lens assembly is Fno, and half of a maximal field of view of the optical imaging lens assembly is HFOV, these parameters have the following values: f=5.98 millimeters (mm); Fno=1.45; and HFOV=27.4 degrees.

When an Abbe number of the second lens element 120 is V2, the following condition is satisfied: V2=23.5.

When a curvature radius of the object-side surface 121 of the second lens element 120 is R3, a curvature radius of the image-side surface 122 of the second lens element 120 is R4, the following condition is satisfied: |(R3+R4)/(R3−R4)|=10.00.

When the focal length of the optical imaging lens assembly is f, a curvature radius of the object-side surface 141 of the fourth lens element 140 is R7, a curvature radius of the image-side surface 142 of the fourth lens element 140 is R8, the following condition is satisfied: (f/R7)+(f/R8)=−0.55.

When a central thickness of the second lens element 120 is CT2, a central thickness of the third lens element 130 is CT3, the following condition is satisfied: CT3/CT2=3.38.

When a central thickness of the first lens element 110 is CT1, the central thickness of the second lens element 120 is CT2, a central thickness of the fourth lens element 140 is CT4, a central thickness of the fifth lens element 150 is CT5, the following condition is satisfied: CT1/(CT2+CT4+CT5)=0.88.

When a sum of central thicknesses of the at least one transparent flat panel located between the image-side surface of the fifth lens element 150 and the image surface 170 is FPCT (In this embodiment, the transparent flat panel is the filter 160, and a central thickness of the filter 160 is FPCT), the following condition is satisfied: FPCT=0.260 mm.

When an entrance pupil diameter of the optical imaging lens assembly is EPD, the central thickness of the second lens element 120 is CT2, the following condition is satisfied: EPD/CT2=12.50.

When a focal length of the first lens element 110 is f1, a focal length of the second lens element 120 is f2, the following condition is satisfied: f1/f2=0.57.

When the focal length of the first lens element 110 is f1, a focal length of the fourth lens element 140 is f4, a focal length of the fifth lens element 150 is f5, the following condition is satisfied: (|f4|+|f5|)/|f1|=0.69.

When an axial distance between the object-side surface 111 of the first lens element 110 and the image surface 170 is TL, the entrance pupil diameter of the optical imaging lens assembly is EPD, the following condition is satisfied: TL/EPD=1.69.

When an axial distance between the image-side surface 152 of the fifth lens element 150 and the image surface 170 is BL, the axial distance between the object-side surface 111 of the first lens element 110 and the image surface 170 is TL, the following condition is satisfied: BL/TL=0.15.

The detailed optical data of the 1st embodiment are shown in Table 1 and the aspheric surface data are shown in Table 2 below.

TABLE 1

1st Embodiment
f = 5.98 mm, Fno = 1.45, HFOV = 27.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.070 | | | | |
| 2 | Lens 1 | 2.440 | (ASP) | 1.513 | Plastic | 1.527 | 55.7 | 8.15 |
| 3 | | 4.436 | (ASP) | 0.301 | | | | |
| 4 | Lens 2 | 2.046 | (ASP) | 0.330 | Plastic | 1.620 | 23.5 | 14.20 |

TABLE 1-continued

1st Embodiment
f = 5.98 mm, Fno = 1.45, HFOV = 27.4 deg.

| Surface # | | Curvature Radius | Thickness | Material | Index | Abbe # | Focal Length |
|---|---|---|---|---|---|---|---|
| 5 | | 2.500 (ASP) | 0.875 | | | | |
| 6 | Lens 3 | −6.735 (ASP) | 1.117 | Plastic | 1.620 | 23.5 | −7.66 |
| 7 | | 17.073 (ASP) | 0.137 | | | | |
| 8 | Lens 4 | 3.343 (ASP) | 0.886 | Plastic | 1.527 | 55.7 | 2.90 |
| 9 | | −2.555 (ASP) | 0.302 | | | | |
| 10 | Lens 5 | −1.857 (ASP) | 0.500 | Plastic | 1.527 | 55.7 | −2.71 |
| 11 | | 6.750 (ASP) | 0.200 | | | | |
| 12 | Filter | Plano | 0.260 | Glass | 1.510 | 64.2 | — |
| 13 | | Plano | 0.564 | | | | |
| 14 | Image | Plano | — | | | | |

Note:
Reference wavelength is 850 nm.
Effective radius of surface 7 is 1.800 mm.

TABLE 2

Aspheric Coefficients

| | Surface # | | | | |
|---|---|---|---|---|---|
| | 2 | 3 | 4 | 5 | 6 |
| k = | −2.5210E+00 | 3.7605E+00 | −2.5517E+00 | −2.5148E+01 | 1.2647E+01 |
| A4 = | 2.2909E−02 | −3.9338E−02 | 4.0345E−02 | 1.6936E−01 | −1.8053E−02 |
| A6 = | −4.4570E−03 | 1.8513E−02 | −1.9969E−02 | −2.1628E−01 | 6.7674E−03 |
| A8 = | 2.2754E−03 | −1.5644E−02 | 1.7085E−02 | 1.9649E−01 | −9.4670E−03 |
| A10 = | −3.7784E−04 | 9.4147E−03 | −1.3695E−02 | −1.2644E−01 | 1.0550E−02 |
| A12 = | −8.1699E−05 | −3.4797E−03 | 6.3616E−03 | 5.1697E−02 | −6.6365E−03 |
| A14 = | 4.0132E−05 | 6.8044E−04 | −1.4997E−03 | −1.1844E−02 | 2.1996E−03 |
| A16 = | −4.1896E−06 | −5.5551E−05 | 1.4482E−04 | 1.1663E−03 | −3.0328E−04 |

| | Surface # | | | | |
|---|---|---|---|---|---|
| | 7 | 8 | 9 | 10 | 11 |
| k = | 8.1166E+01 | −1.1164E+00 | −1.2137E+00 | −7.6767E+00 | 4.0338E+00 |
| A4 = | −9.2970E−02 | −6.5159E−02 | 1.1078E−01 | −3.6619E−03 | −2.5283E−02 |
| A6 = | 1.5266E−02 | −5.7916E−03 | −4.7553E−02 | −9.7065E−03 | −3.1823E−04 |
| A8 = | −1.2060E−03 | 2.6073E−03 | −8.8012E−04 | 5.9893E−03 | 2.0466E−03 |
| A10 = | 9.1945E−04 | −7.5684E−03 | 6.1641E−03 | −1.1743E−03 | −7.1105E−04 |
| A12 = | −3.2015E−03 | 5.6594E−03 | −1.9054E−03 | 8.6082E−05 | 1.1089E−04 |
| A14 = | 6.6599E−06 | −1.6583E−03 | 2.5040E−04 | 2.1375E−07 | −8.4185E−06 |
| A16 = | 4.2351E−06 | 1.7273E−04 | −1.2591E−05 | −2.1001E−07 | 2.4777E−07 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
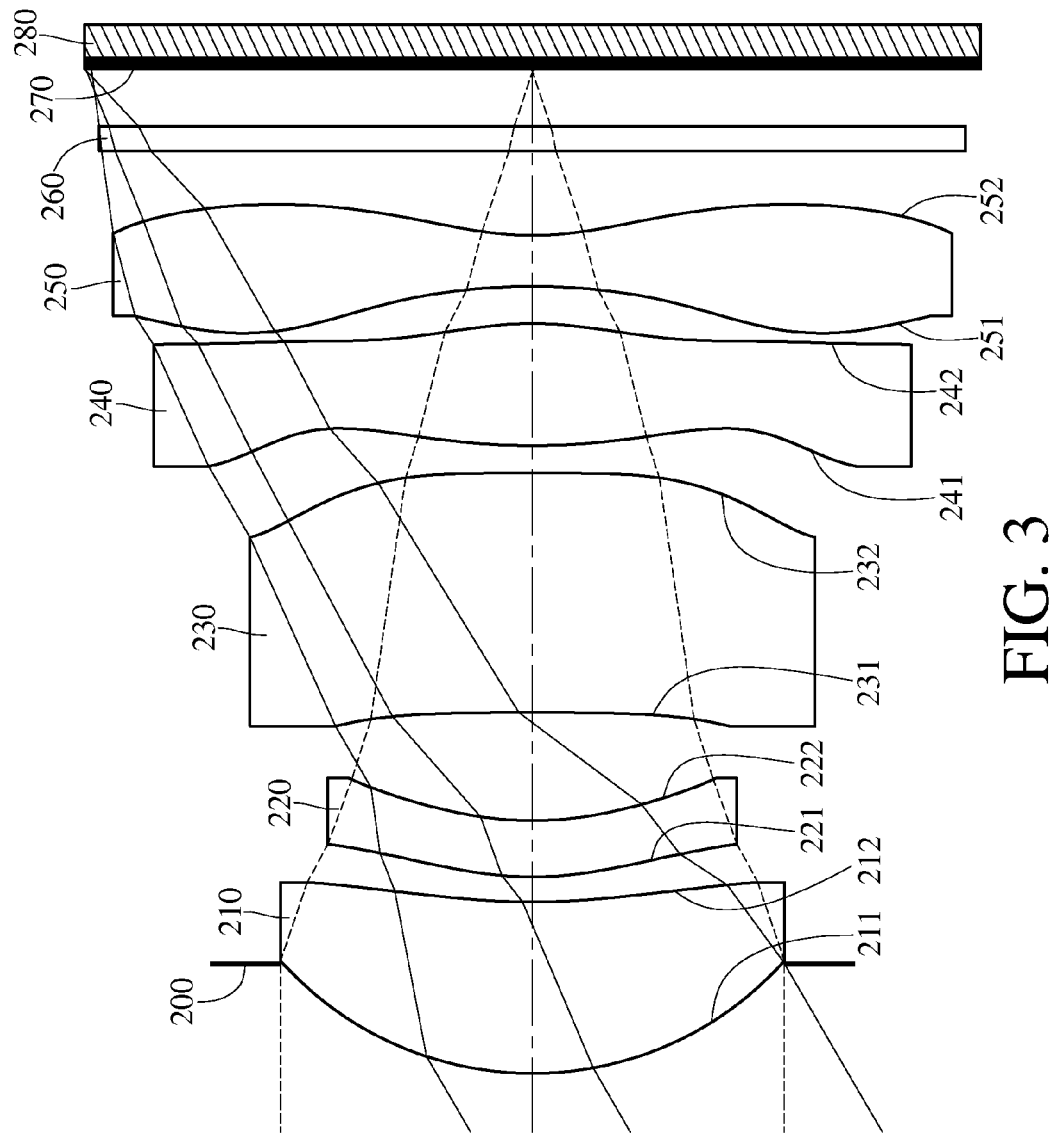
FIG. 3 is a schematic view of an image capturing unit according to the 2nd embodiment of the present disclosure.
Figure 4:
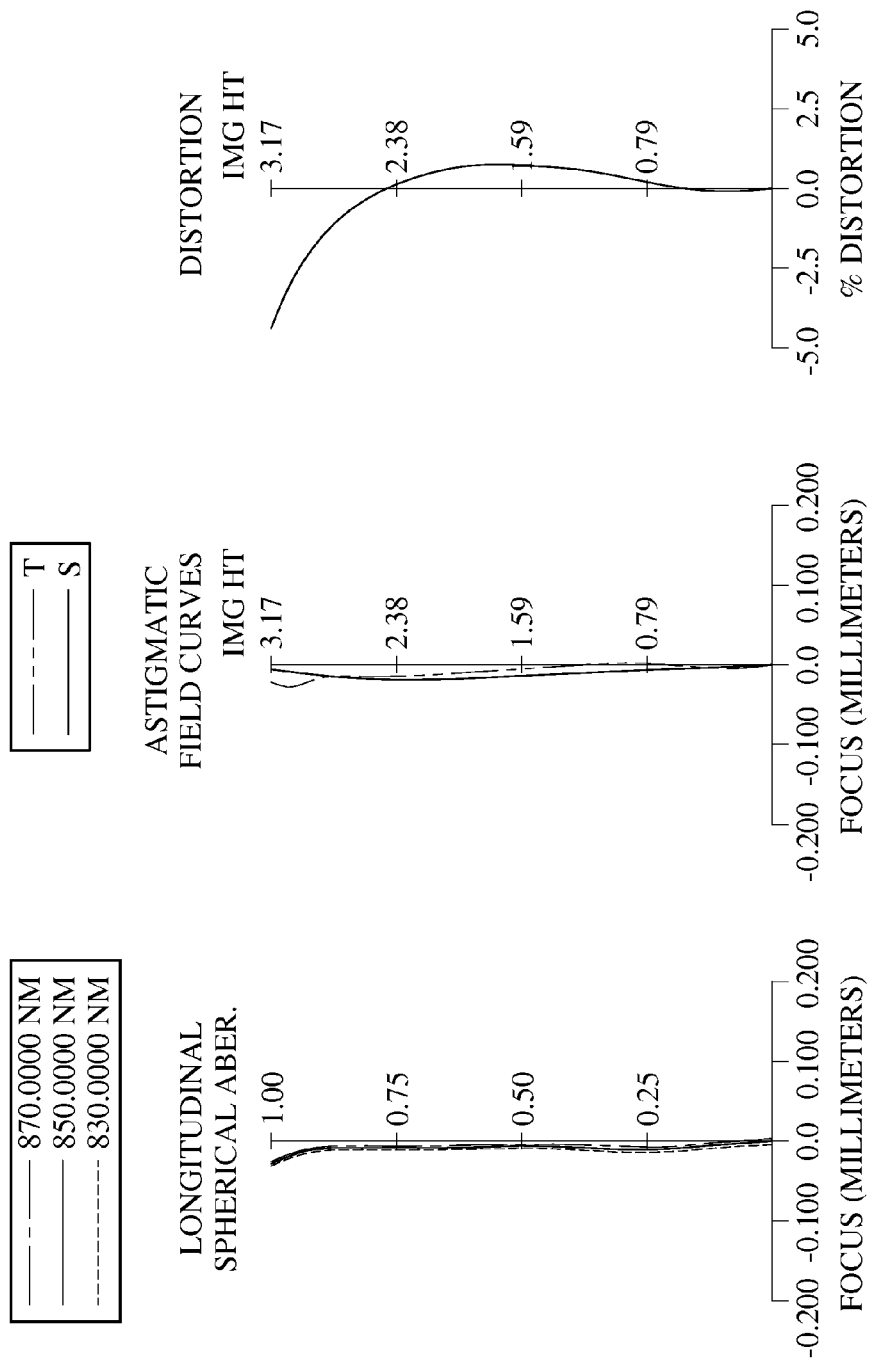
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging lens assembly (its reference numeral is omitted) of the present disclosure and an image sensor 280. The optical imaging lens assembly includes, in order from an object side to an image side, an aperture stop 200, a first lens element 210, a second lens element 220, a third lens element 230, a fourth lens element 240, a fifth lens element 250, a filter 260 and an image surface 270, wherein the optical imaging lens assembly has a total of five non-cemented lens elements (210-250) with refractive power. There is an air gap in a paraxial region between every two of the first lens element 210, the second lens element 220, the third lens element 230, the fourth lens element 240 and the fifth lens element 250 that are adjacent to each other.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with negative refractive power has an object-side surface 231 being concave in a paraxial region thereof and an image-side surface 232 being convex in a paraxial region thereof. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric. The object-side surface 241 of the fourth lens element 240 has at least one inflection point in an off-axis region thereof.

The fifth lens element 250 with negative refractive power has an object-side surface 251 being concave in a paraxial region thereof and an image-side surface 252 being concave in a paraxial region thereof. The fifth lens element 250 is made of plastic material and has the object-side surface 251 and the image-side surface 252 being both aspheric. The image-side surface 252 of the fifth lens element 250 has at least one convex shape in an off-axis region thereof.

The filter 260 is made of glass and located between the fifth lens element 250 and the image surface 270, and will not affect the focal length of the optical imaging lens assembly. The image sensor 280 is disposed on or near the image surface 270 of the optical imaging lens assembly.

The detailed optical data of the 2nd embodiment are shown in Table 3 and the aspheric surface data are shown in Table 4 below.

TABLE 3

2nd Embodiment
f = 5.73 mm, Fno = 1.60, HFOV = 30.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.780 | | | | |
| 2 | Lens 1 | 2.414 (ASP) | 1.218 | Plastic | 1.537 | 55.9 | 8.14 |
| 3 | | 4.444 (ASP) | 0.179 | | | | |
| 4 | Lens 2 | 2.372 (ASP) | 0.400 | Plastic | 1.614 | 23.4 | 53.37 |
| 5 | | 2.393 (ASP) | 0.769 | | | | |
| 6 | Lens 3 | −47.722 (ASP) | 1.703 | Plastic | 1.537 | 55.9 | −220.34 |
| 7 | | −81.015 (ASP) | 0.195 | | | | |
| 8 | Lens 4 | 4.733 (ASP) | 0.867 | Plastic | 1.523 | 55.8 | 3.17 |
| 9 | | −2.389 (ASP) | 0.265 | | | | |
| 10 | Lens 5 | −4.043 (ASP) | 0.362 | Plastic | 1.549 | 42.0 | −2.52 |
| 11 | | 2.174 (ASP) | 0.600 | | | | |
| 12 | Filter | Plano | 0.175 | Glass | 1.510 | 64.2 | — |
| 13 | | Plano | 0.411 | | | | |
| 14 | Image | Plano | — | | | | |

Note:
Reference wavelength is 850 nm.
Effective radius of surface 8 is 2.300 mm.

TABLE 4

Aspheric Coefficients

| | Surface # | | | | |
|---|---|---|---|---|---|
| | 2 | 3 | 4 | 5 | 6 |
| k = | −2.1732E+00 | 4.5352E+00 | −3.5542E+00 | −1.5008E+01 | −9.0000E+01 |
| A4 = | 1.9717E−02 | −6.0714E−02 | −4.5799E−02 | 9.9174E−02 | −1.8403E−02 |
| A6 = | −6.8488E−04 | 2.5679E−02 | −1.3145E−03 | −1.4082E−01 | 1.1632E−03 |
| A8 = | 4.4767E−04 | −9.7543E−03 | 1.6778E−02 | 1.4351E−01 | −4.0807E−03 |
| A10 = | 2.8543E−04 | 1.8429E−03 | −1.3790E−02 | −9.8453E−02 | 2.8547E−03 |
| A12 = | −2.8849E−04 | −1.0381E−04 | 6.1676E−03 | 4.4180E−02 | −1.0254E−03 |
| A14 = | 9.8592E−05 | −3.5083E−05 | −1.5112E−03 | −1.1423E−02 | 1.6669E−04 |
| A16 = | −1.2055E−05 | 3.5320E−07 | 1.5313E−04 | 1.3103E−03 | 3.8920E−06 |

| | Surface # | | | | |
|---|---|---|---|---|---|
| | 7 | 8 | 9 | 10 | 11 |
| k = | 9.0000E+01 | −3.9089E+01 | −1.6377E+01 | −8.2829E+01 | −5.1965E−01 |
| A4 = | −4.6862E−02 | 2.8906E−02 | 3.3787E−02 | −6.2940E−02 | −1.2510E−01 |
| A6 = | 3.7352E−03 | −2.3029E−02 | 1.1964E−02 | 1.8835E−02 | 4.4616E−02 |
| A8 = | −5.8140E−03 | 6.3483E−03 | −1.4015E−02 | 4.2756E−04 | −1.2571E−02 |
| A10 = | 5.3692E−03 | −2.8273E−03 | 4.5670E−03 | −9.7500E−04 | 2.3599E−03 |

TABLE 4-continued

| Aspheric Coefficients | | | | |
|---|---|---|---|---|
| A12 = | −1.9700E−03 | 8.6881E−04 | −7.3152E−04 | 1.8173E−04 | −2.7962E−04 |
| A14 = | 3.4653E−04 | −1.1667E−04 | 5.9359E−05 | −1.4554E−05 | 1.8704E−05 |
| A16 = | −2.3484E−05 | 5.5606E−06 | −1.9599E−06 | 4.4832E−07 | −5.4183E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 5.73 | CT1/(CT2 + CT4 + CT5) | 0.75 |
| Fno | 1.60 | FPCT [mm] | 0.175 |
| HFOV [deg.] | 30.1 | EPD/CT2 | 8.95 |
| V2 | 23.4 | f1/f2 | 0.15 |
| |(R3 + R4)/(R3 − R4)| | 223.84 | (|f4| + |f5|)/|f1| | 0.70 |
| (f/R7) + (f/R8) | −1.19 | TL/EPD | 1.99 |
| CT3/CT2 | 4.26 | BL/TL | 0.17 |

3rd Embodiment

Figure 5:
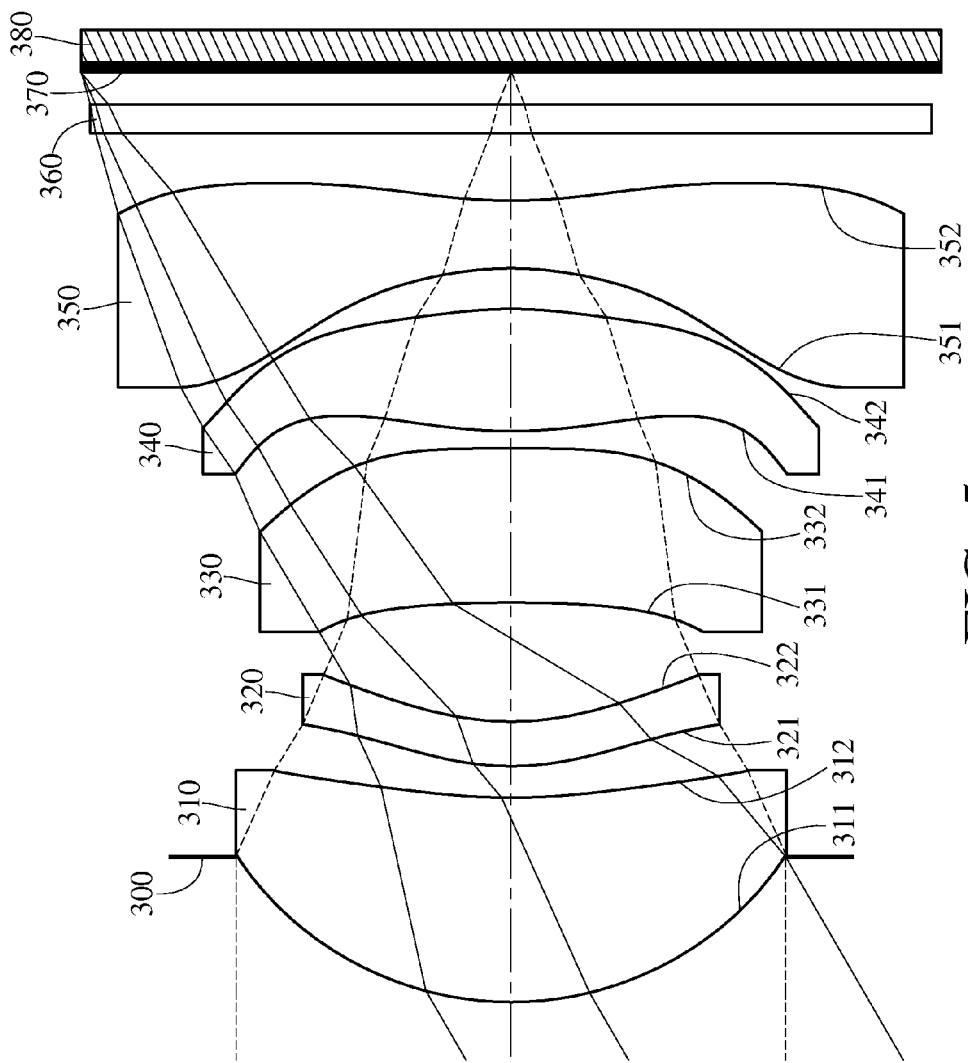
FIG. 5 is a schematic view of an image capturing unit according to the 3rd embodiment of the present disclosure.
Figure 6:
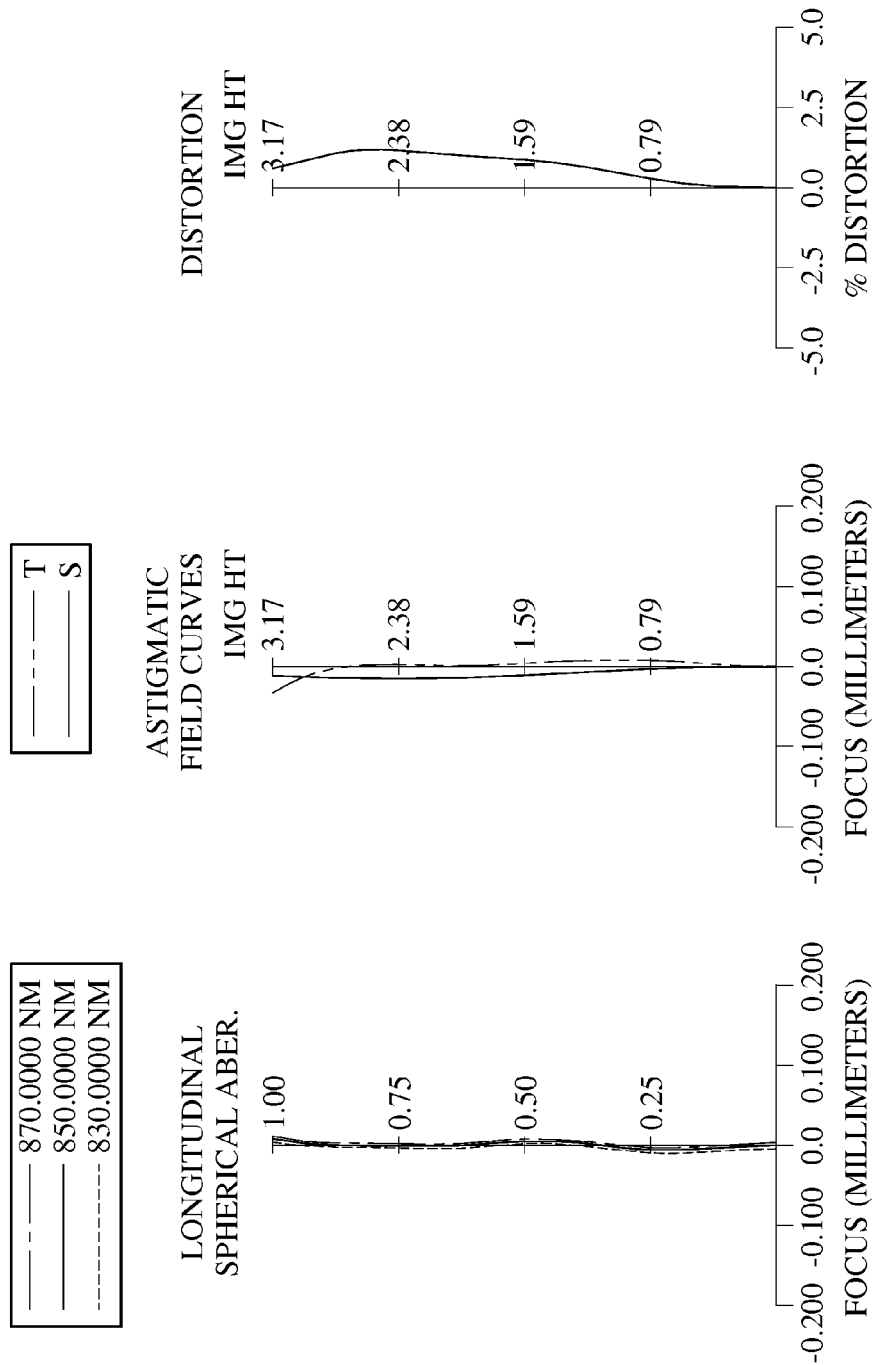
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging lens assembly (its reference numeral is omitted) of the present disclosure and an image sensor 380. The optical imaging lens assembly includes, in order from an object side to an image side, an aperture stop 300, a first lens element 310, a second lens element 320, a third lens element 330, a fourth lens element 340, a fifth lens element 350, a filter 360 and an image surface 370, wherein the optical imaging lens assembly has a total of five non-cemented lens elements (310-350) with refractive power. There is an air gap in a paraxial region between every two of the first lens element 310, the second lens element 320, the third lens element 330, the fourth lens element 340 and the fifth lens element 350 that are adjacent to each other.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with positive refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with negative refractive power has an object-side surface 331 being concave in a paraxial region thereof and an image-side surface 332 being convex in a paraxial region thereof. The third lens element 330 is made of plastic material and has the object-side surface 331 and the image-side surface 332 being both aspheric.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric. The object-side surface 341 of the fourth lens element 340 has at least one inflection point in an off-axis region thereof.

The fifth lens element 350 with negative refractive power has an object-side surface 351 being concave in a paraxial region thereof and an image-side surface 352 being concave in a paraxial region thereof. The fifth lens element 350 is made of plastic material and has the object-side surface 351 and the image-side surface 352 being both aspheric. The image-side surface 352 of the fifth lens element 350 has at least one convex shape in an off-axis region thereof.

The filter 360 is made of glass and located between the fifth lens element 350 and the image surface 370, and will not affect the focal length of the optical imaging lens assembly. The image sensor 380 is disposed on or near the image surface 370 of the optical imaging lens assembly.

The detailed optical data of the 3rd embodiment are shown in Table 5 and the aspheric surface data are shown in Table 6 below.

TABLE 5

3rd Embodiment
f = 5.45 mm, Fno = 1.35, HFOV = 30.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −1.070 | | | | |
| 2 | Lens 1 | 2.442 (ASP) | 1.510 | Plastic | 1.537 | 55.9 | 8.00 |
| 3 | | 4.443 (ASP) | 0.233 | | | | |
| 4 | Lens 2 | 2.045 (ASP) | 0.330 | Plastic | 1.620 | 23.5 | 26.14 |
| 5 | | 2.197 (ASP) | 0.879 | | | | |
| 6 | Lens 3 | −10.720 (ASP) | 1.139 | Plastic | 1.527 | 55.7 | −28.99 |
| 7 | | −37.201 (ASP) | 0.128 | | | | |
| 8 | Lens 4 | 3.717 (ASP) | 0.902 | Plastic | 1.527 | 55.7 | 3.28 |

TABLE 5-continued

3rd Embodiment
f = 5.45 mm, Fno = 1.35, HFOV = 30.0 deg.

| Surface # | | Curvature Radius | Thickness | Material | Index | Abbe # | Focal Length |
|---|---|---|---|---|---|---|---|
| 9 | | −2.969 (ASP) | 0.300 | | | | |
| 10 | Lens 5 | −2.459 (ASP) | 0.500 | Plastic | 1.527 | 55.7 | −2.74 |
| 11 | | 3.741 (ASP) | 0.500 | | | | |
| 12 | Filter | Plano | 0.210 | Glass | 1.510 | 64.2 | — |
| 13 | | Plano | 0.238 | | | | |
| 14 | Image | Plano | — | | | | |

Note:
Reference wavelength is 850 nm.
Effective radius of surface 11 is 2.900 mm.

TABLE 6

Aspheric Coefficients

| | Surface # | | | | |
|---|---|---|---|---|---|
| | 2 | 3 | 4 | 5 | 6 |
| k = | −2.3710E+00 | 4.3398E+00 | −3.6410E+00 | −7.7684E+00 | 4.4941E+01 |
| A4 = | 2.0309E−02 | −5.0649E−02 | −1.2833E−02 | 6.7234E−02 | −1.1898E−02 |
| A6 = | −2.0469E−03 | 2.1852E−02 | −2.1483E−02 | −7.8791E−02 | −9.2735E−03 |
| A8 = | 1.7347E−03 | −1.3361E−02 | 1.5626E−02 | 5.3846E−02 | 9.9434E−03 |
| A10 = | −7.6959E−04 | 7.3493E−03 | −9.1498E−03 | −2.7053E−02 | −1.0754E−02 |
| A12 = | 2.2949E−04 | −2.9447E−03 | 4.3285E−03 | 1.0232E−02 | 6.2428E−03 |
| A14 = | −3.8029E−05 | 6.6558E−04 | −1.1435E−03 | −2.4092E−03 | −1.8999E−03 |
| A16 = | 2.9263E−06 | −6.4272E−05 | 1.2298E−04 | 2.6812E−04 | 2.4168E−04 |

| | Surface # | | | | |
|---|---|---|---|---|---|
| | 7 | 8 | 9 | 10 | 11 |
| k = | 8.9396E+01 | 1.0537E+00 | −3.7924E−01 | −9.1585E+00 | −2.4833E−01 |
| A4 = | −5.8788E−02 | −2.9301E−02 | 1.0721E−01 | −1.2796E−02 | −5.2774E−02 |
| A6 = | −2.5701E−02 | −1.4375E−02 | −4.0930E−02 | −2.8249E−02 | 7.3578E−03 |
| A8 = | 2.8007E−02 | 1.2714E−03 | −6.6595E−03 | 1.3599E−02 | 6.7106E−04 |
| A10 = | −1.1687E−02 | 1.7448E−03 | 8.1713E−03 | −2.3151E−03 | −4.3990E−04 |
| A12 = | 2.5544E−03 | −6.1782E−04 | −2.2679E−03 | 1.4788E−04 | 6.8750E−05 |
| A14 = | −2.7857E−04 | 3.4756E−05 | 2.7264E−04 | 1.5781E−06 | −5.0045E−06 |
| A16 = | 1.1983E−05 | 4.7466E−06 | −1.2051E−05 | −4.0095E−07 | 1.4718E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 5.45 | CT1/(CT2 + CT4 + CT5) | 0.87 |
| Fno | 1.35 | FPCT [mm] | 0.210 |
| HFOV [deg.] | 30.0 | EPD/CT2 | 12.23 |
| V2 | 23.5 | f1/f2 | 0.31 |
| |(R3 + R4)/(R3 − R4)| | 28.07 | (|f4| + |f5|)/|f1| | 0.75 |
| (f/R7) + (f/R8) | −0.37 | TL/EPD | 1.70 |
| CT3/CT2 | 3.45 | BL/TL | 0.14 |

4th Embodiment

Figure 7:
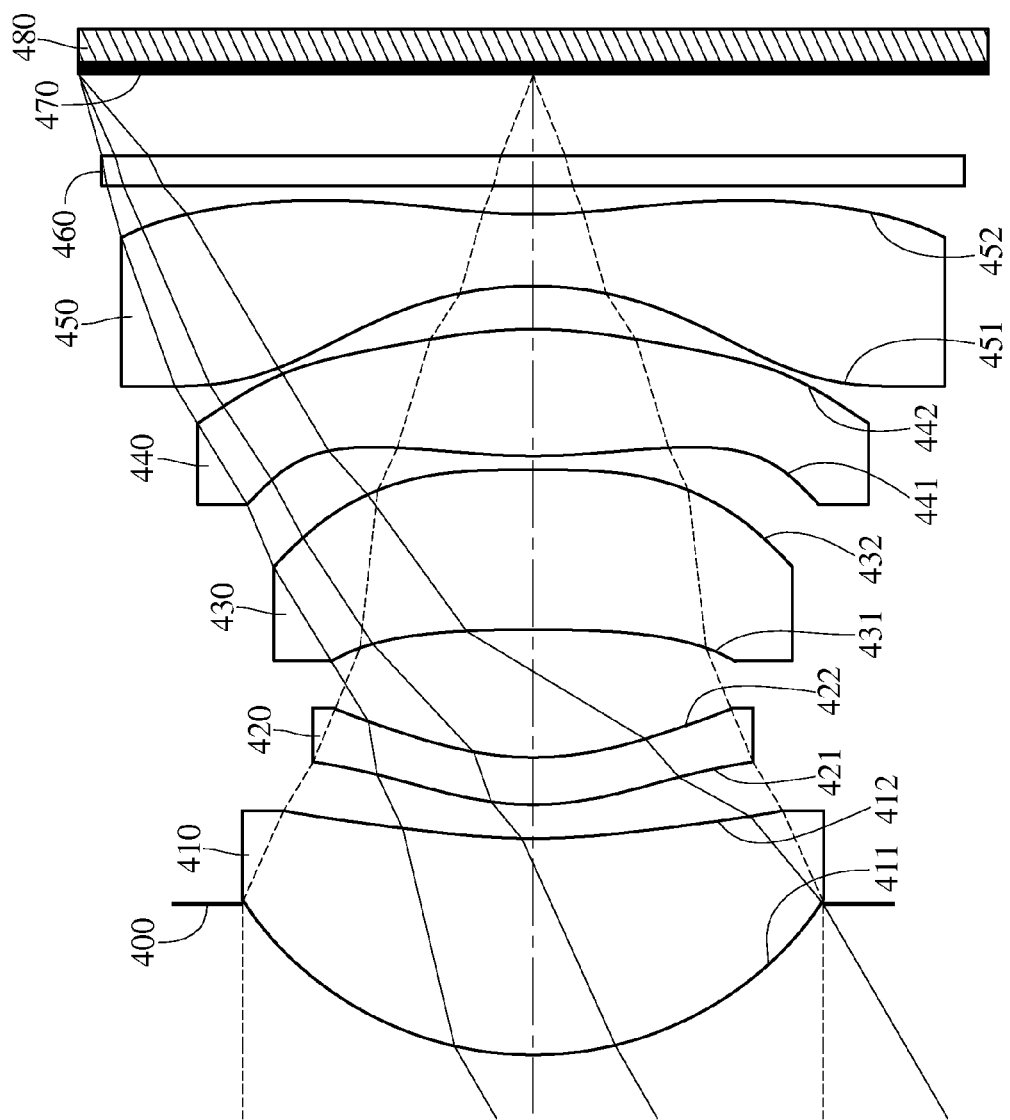
FIG. 7 is a schematic view of an image capturing unit according to the 4th embodiment of the present disclosure.
Figure 8:
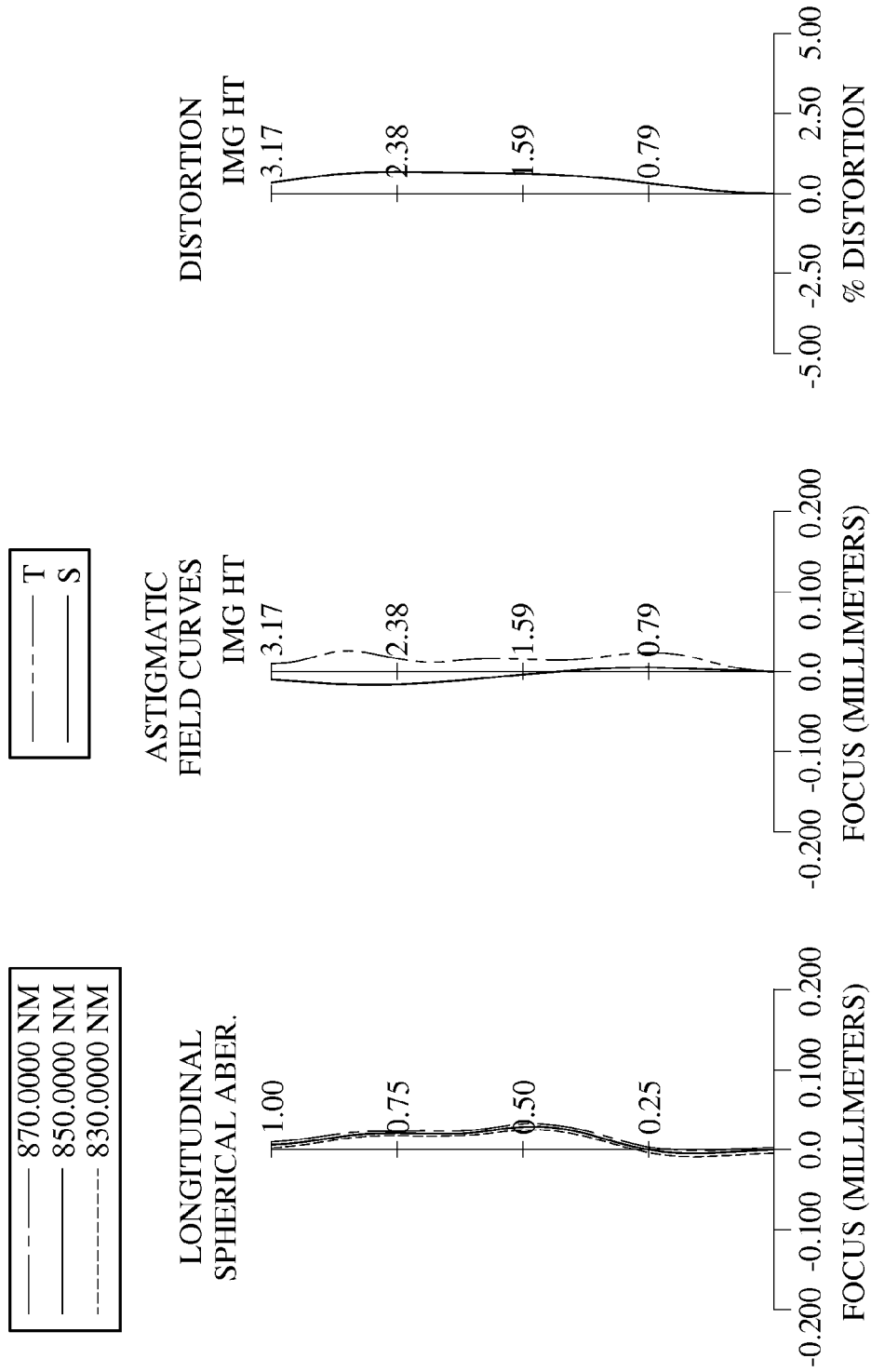
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging lens assembly (its reference numeral is omitted) of the present disclosure and an image sensor 480. The optical imaging lens assembly includes, in order from an object side to an image side, an aperture stop 400, a first lens element 410, a second lens element 420, a third lens element 430, a fourth lens element 440, a fifth lens element 450, a filter 460 and an image surface 470, wherein the optical imaging lens assembly has a total of five non-cemented lens elements (410-450) with refractive power. There is an air gap in a paraxial region between every two of the first lens element 410, the second lens element 420, the third lens element 430, the fourth lens element 440 and the fifth lens element 450 that are adjacent to each other.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with negative refractive power has an object-side surface 431 being concave in a paraxial region thereof and an image-side surface 432 being convex in a paraxial region thereof. The third lens element 430 is made of plastic material and has the object-side surface 431 and the image-side surface 432 being both aspheric.

The fourth lens element 440 with positive refractive power has an object-side surface 441 being convex in a paraxial region thereof and an image-side surface 442 being convex in a paraxial region thereof. The fourth lens element 440 is made of plastic material and has the object-side surface 441 and the image-side surface 442 being both aspheric. The object-side surface 441 of the fourth lens element 440 has at least one inflection point in an off-axis region thereof.

The fifth lens element 450 with negative refractive power has an object-side surface 451 being concave in a paraxial region thereof and an image-side surface 452 being concave in a paraxial region thereof. The fifth lens element 450 is made of plastic material and has the object-side surface 451 and the image-side surface 452 being both aspheric. The image-side surface 452 of the fifth lens element 450 has at least one convex shape in an off-axis region thereof.

The filter 460 is made of glass and located between the fifth lens element 450 and the image surface 470, and will not affect the focal length of the optical imaging lens assembly. The image sensor 480 is disposed on or near the image surface 470 of the optical imaging lens assembly.

The detailed optical data of the 4th embodiment are shown in Table 7 and the aspheric surface data are shown in Table 8 below.

TABLE 7

4th Embodiment
f = 5.45 mm, Fno = 1.35, HFOV = 30.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −1.060 | | | | |
| 2 | Lens 1 | 2.444 (ASP) | 1.513 | Plastic | 1.537 | 55.9 | 8.00 |
| 3 | | 4.450 (ASP) | 0.237 | | | | |
| 4 | Lens 2 | 2.049 (ASP) | 0.330 | Plastic | 1.620 | 23.5 | 26.44 |
| 5 | | 2.197 (ASP) | 0.895 | | | | |
| 6 | Lens 3 | −10.805 (ASP) | 1.117 | Plastic | 1.527 | 55.7 | −90.90 |
| 7 | | −14.448 (ASP) | 0.096 | | | | |
| 8 | Lens 4 | 4.455 (ASP) | 0.886 | Plastic | 1.527 | 55.7 | 3.51 |
| 9 | | −2.956 (ASP) | 0.302 | | | | |
| 10 | Lens 5 | −2.447 (ASP) | 0.500 | Plastic | 1.527 | 55.7 | −2.76 |
| 11 | | 3.839 (ASP) | 0.200 | | | | |
| 12 | Filter | Plano | 0.210 | Glass | 1.510 | 64.2 | — |
| 13 | | Plano | 0.576 | | | | |
| 14 | Image | Plano | — | — | | | |

Note:
Reference wavelength is 850 nm.
Effective radius of surface 10 is 2.500 mm.

TABLE 8

Aspheric Coefficients

| | Surface # | | | | |
|---|---|---|---|---|---|
| | 2 | 3 | 4 | 5 | 6 |
| k = | −2.4826E+00 | 4.3410E+00 | −3.8793E+00 | −7.8125E+00 | 4.4930E+01 |
| A4 = | 2.1799E−02 | −5.3373E−02 | −1.4105E−02 | 6.4727E−02 | −2.1914E−02 |
| A6 = | −4.3923E−03 | 2.7763E−02 | −2.0189E−02 | −7.9210E−02 | 9.0652E−03 |
| A8 = | 4.3601E−03 | −2.1596E−02 | 1.1850E−02 | 5.5246E−02 | −1.3740E−02 |
| A10 = | −2.4011E−03 | 1.3397E−02 | −4.8899E−03 | −2.8530E−02 | 8.0386E−03 |
| A12 = | 7.7130E−04 | −5.2894E−03 | 2.2588E−03 | 1.1602E−02 | −2.5292E−03 |
| A14 = | −1.2874E−04 | 1.1264E−03 | −6.7002E−04 | −2.9846E−03 | 2.5915E−04 |
| A16 = | 8.9518E−06 | −1.0049E−04 | 7.9298E−05 | 3.4720E−04 | 2.5836E−05 |

| | Surface # | | | | |
|---|---|---|---|---|---|
| | 7 | 8 | 9 | 10 | 11 |
| k = | 4.2367E+01 | 9.2265E−01 | −7.9389E−01 | −1.1493E+01 | 5.0656E−01 |
| A4 = | −1.0322E−01 | −7.8138E−02 | 8.5059E−02 | −7.1700E−02 | −7.6871E−02 |
| A6 = | 3.3571E−02 | 3.8382E−02 | −5.3686E−02 | 2.0679E−02 | 2.7449E−02 |

TABLE 8-continued

| Aspheric Coefficients | | | | | |
|---|---|---|---|---|---|
| A8 = | −5.2703E−03 | −2.4231E−02 | 2.5398E−02 | −4.3508E−04 | −8.0769E−03 |
| A10 = | −2.6707E−03 | 1.1020E−02 | −8.2308E−03 | −5.8019E−04 | 1.5812E−03 |
| A12 = | 1.7615E−03 | −3.5270E−03 | 1.5459E−03 | 1.0295E−04 | −1.9090E−04 |
| A14 = | −4.1129E−04 | 6.0585E−04 | −1.5040E−04 | −7.6917E−06 | 1.2663E−05 |
| A16 = | 3.7411E−05 | −3.9919E−05 | 5.9147E−06 | 2.3599E−07 | −3.5629E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 5.45 | CT1/(CT2 + CT4 + CT5) | 0.88 |
| Fno | 1.35 | FPCT [mm] | 0.210 |
| HFOV [deg.] | 30.1 | EPD/CT2 | 12.23 |
| V2 | 23.5 | f1/f2 | 0.30 |
| (R3 + R4)/(R3 − R4) | 28.61 | (\|f4\| + \|f5\|)/\|f1\| | 0.78 |
| (f/R7) + (f/R8) | −0.62 | TL/EPD | 1.70 |
| CT3/CT2 | 3.38 | BL/TL | 0.14 |

5th Embodiment

Figure 9:
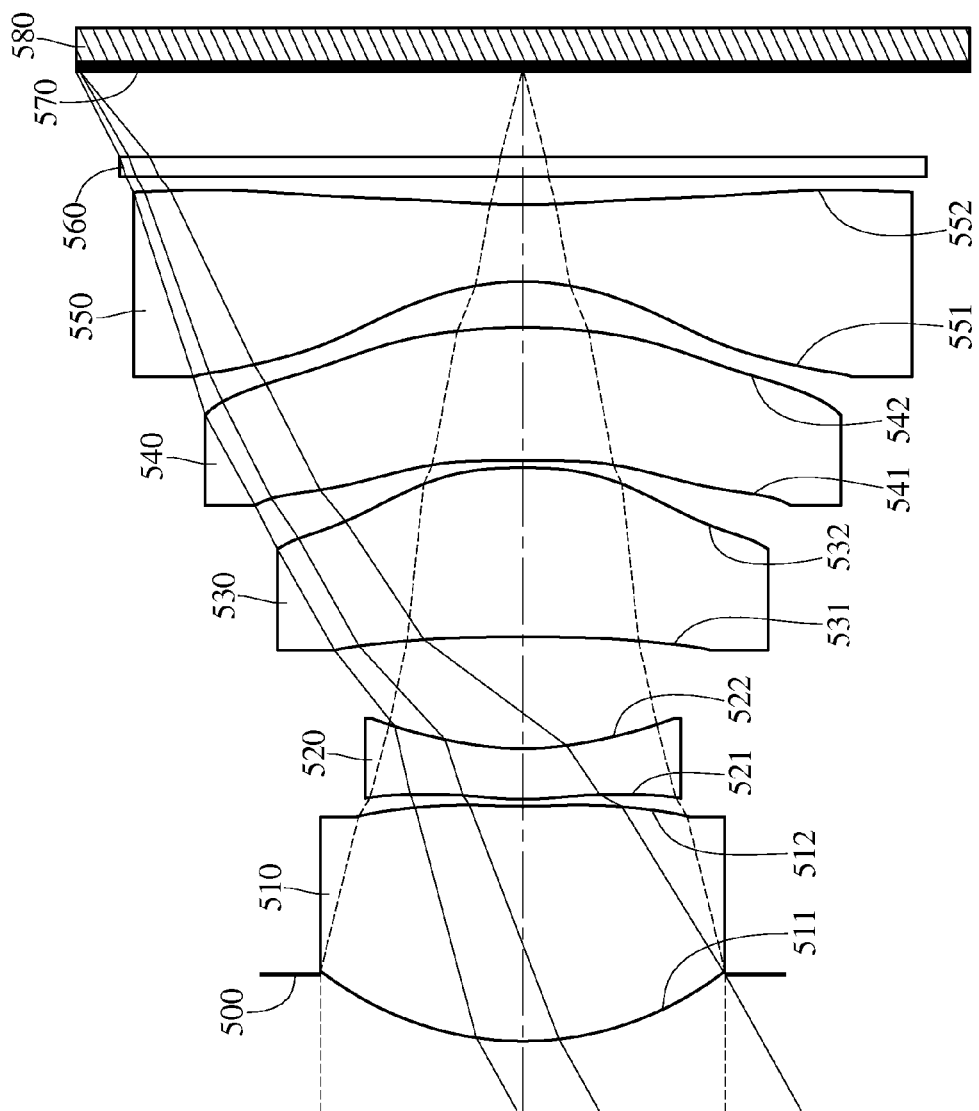
FIG. 9 is a schematic view of an image capturing unit according to the 5th embodiment of the present disclosure.
Figure 10:
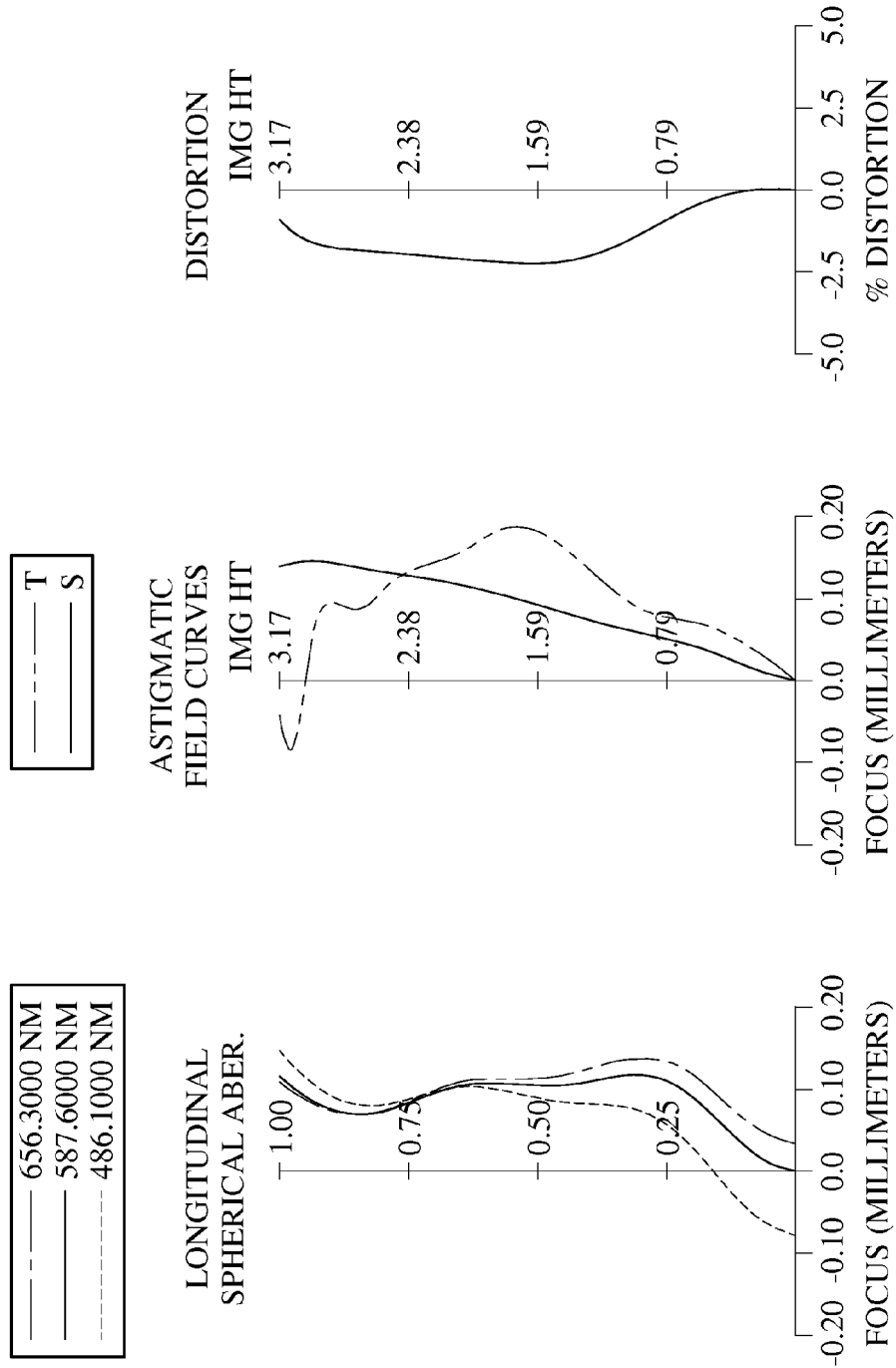
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging lens assembly (its reference numeral is omitted) of the present disclosure and an image sensor 580. The optical imaging lens assembly includes, in order from an object side to an image side, an aperture stop 500, a first lens element 510, a second lens element 520, a third lens element 530, a fourth lens element 540, a fifth lens element 550, a filter 560 and an image surface 570, wherein the optical imaging lens assembly has a total of five non-cemented lens elements (510-550) with refractive power. There is an air gap in a paraxial region between every two of the first lens element 510, the second lens element 520, the third lens element 530, the fourth lens element 540 and the fifth lens element 550 that are adjacent to each other.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with positive refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric. The object-side surface 541 of the fourth lens element 540 has at least one inflection point in an off-axis region thereof.

The fifth lens element 550 with negative refractive power has an object-side surface 551 being concave in a paraxial region thereof and an image-side surface 552 being concave in a paraxial region thereof. The fifth lens element 550 is made of plastic material and has the object-side surface 551 and the image-side surface 552 being both aspheric. The image-side surface 552 of the fifth lens element 550 has at least one convex shape in an off-axis region thereof.

The filter 560 is made of glass and located between the fifth lens element 550 and the image surface 570, and will not affect the focal length of the optical imaging lens assembly. The image sensor 580 is disposed on or near the image surface 570 of the optical imaging lens assembly.

The detailed optical data of the 5th embodiment are shown in Table 9 and the aspheric surface data are shown in Table 10 below.

TABLE 9

5th Embodiment
f = 5.65 mm, Fno = 1.95, HFOV = 29.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.480 | | | | |
| 2 | Lens 1 | 2.311 (ASP) | 1.685 | Plastic | 1.544 | 55.9 | 7.79 |
| 3 | | 3.773 (ASP) | 0.050 | | | | |
| 4 | Lens 2 | 2.006 (ASP) | 0.363 | Plastic | 1.639 | 23.5 | 55.35 |
| 5 | | 1.977 (ASP) | 0.803 | | | | |
| 6 | Lens 3 | −21.162 (ASP) | 1.214 | Plastic | 1.544 | 55.9 | 7.91 |

TABLE 9-continued

5th Embodiment
f = 5.65 mm, Fno = 1.95, HFOV = 29.1 deg.

| Surface # | | Curvature Radius | Thickness | Material | Index | Abbe # | Focal Length |
|---|---|---|---|---|---|---|---|
| 7 | | −3.651 (ASP) | 0.050 | | | | |
| 8 | Lens 4 | 67.400 (ASP) | 0.957 | Plastic | 1.639 | 23.5 | 5.33 |
| 9 | | −3.570 (ASP) | 0.330 | | | | |
| 10 | Lens 5 | −1.711 (ASP) | 0.550 | Plastic | 1.530 | 55.8 | −2.34 |
| 11 | | 4.985 (ASP) | 0.200 | | | | |
| 12 | Filter | Plano | 0.145 | Glass | 1.517 | 64.2 | — |
| 13 | | Plano | 0.607 | | | | |
| 14 | Image | Plano | — | | | | |

Note:
Reference wavelength is 587.6 nm (d-line).
Effective radius of surface 6 is 1.350 mm.

TABLE 10

Aspheric Coefficients

| | Surface # | | | | |
|---|---|---|---|---|---|
| | 2 | 3 | 4 | 5 | 6 |
| k = | −1.9403E+00 | −1.3221E+01 | −1.9419E+01 | −9.7088E+00 | 1.6390E+00 |
| A4 = | 1.7482E−02 | −6.1176E−01 | −4.5492E−01 | −3.0850E−02 | −2.9968E−02 |
| A6 = | 7.7984E−03 | 1.2415E+00 | 7.9956E−01 | −1.7180E−02 | −1.3553E−02 |
| A8 = | −1.7762E−02 | −1.5216E+00 | −7.7788E−01 | 2.8611E−01 | 4.2687E−02 |
| A10 = | 2.0927E−02 | 1.1461E+00 | 3.8269E−01 | −4.9527E−01 | −3.0015E−02 |
| A12 = | −1.3221E−02 | −5.1905E−01 | −5.9857E−02 | 3.9416E−01 | 1.1503E−02 |
| A14 = | 4.2837E−03 | 1.2887E−01 | −1.9622E−02 | −1.5435E−01 | −3.0164E−03 |
| A16 = | −5.6737E−04 | −1.3436E−02 | 6.5070E−03 | 2.4130E−02 | 3.4319E−04 |

| | Surface # | | | | |
|---|---|---|---|---|---|
| | 7 | 8 | 9 | 10 | 11 |
| k = | −7.6328E+01 | 9.0000E+01 | −1.6702E−01 | −8.5851E+00 | 1.6033E+00 |
| A4 = | −4.7885E−01 | −2.6929E−01 | 9.8316E−02 | −6.1832E−02 | −1.0269E−01 |
| A6 = | 5.5198E−01 | 2.3373E−01 | −1.7401E−01 | −1.8385E−02 | 6.2634E−02 |
| A8 = | −3.8352E−01 | −1.0399E−01 | 1.2351E−01 | 4.3053E−02 | −2.2232E−02 |
| A10 = | 1.7731E−01 | 2.7983E−02 | −4.3484E−02 | −1.8873E−02 | 4.6774E−03 |
| A12 = | −5.0174E−02 | −4.4803E−03 | 8.2056E−03 | 3.7664E−03 | −5.8736E−04 |
| A14 = | 7.6078E−03 | 3.6823E−04 | −7.9392E−04 | −3.6035E−04 | 4.0579E−05 |
| A16 = | −4.7050E−04 | −1.1946E−05 | 3.0664E−05 | 1.3257E−05 | −1.1851E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 5.65 | CT1/(CT2 + CT4 + CT5) | 0.90 |
| Fno | 1.95 | FPCT [mm] | 0.145 |
| HFOV [deg.] | 29.1 | EPD/CT2 | 7.98 |
| V2 | 23.5 | f1/f2 | 0.14 |
| |(R3 + R4)/(R3 − R4)| | 135.37 | (|f4| + |f5|)/|f1| | 0.98 |
| (f/R7) + (f/R8) | −1.50 | TL/EPD | 2.40 |
| CT3/CT2 | 3.34 | BL/TL | 0.14 |

6th Embodiment

Figure 11:
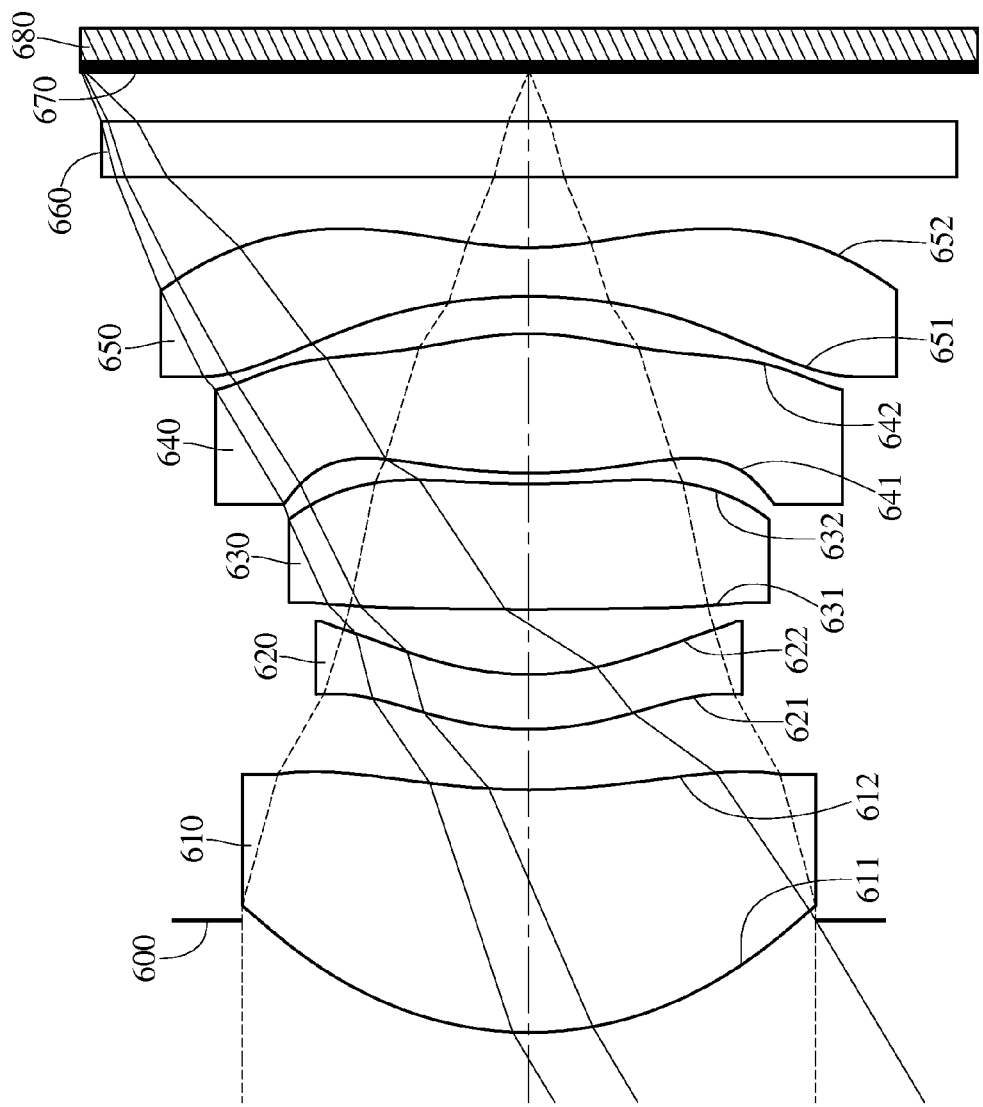
FIG. 11 is a schematic view of an image capturing unit according to the 6th embodiment of the present disclosure.
Figure 12:
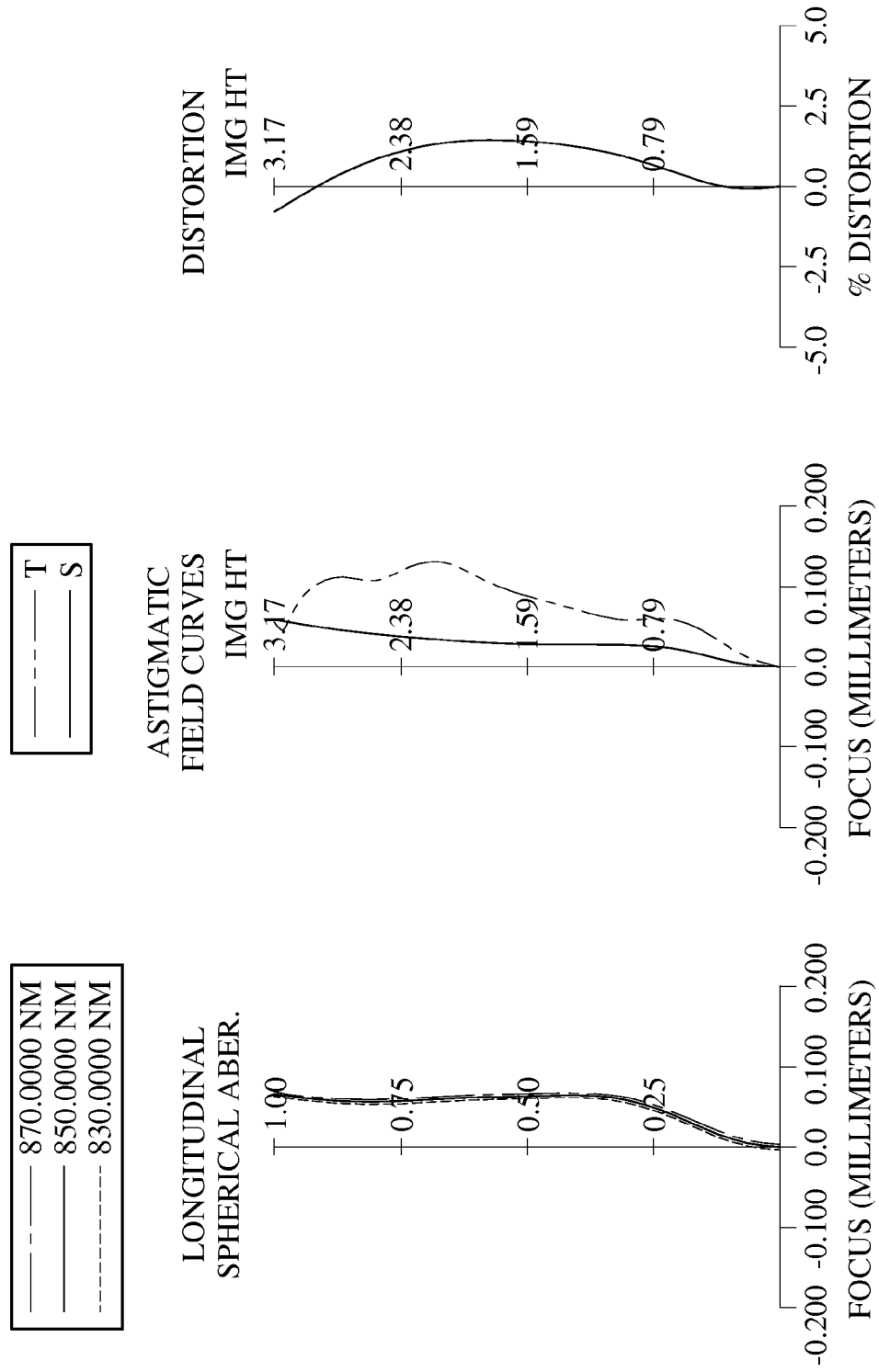
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging lens assembly (its reference numeral is omitted) of the present disclosure and an image sensor 680. The optical imaging lens assembly includes, in order from an object side to an image side, an aperture stop 600, a first lens element 610, a second lens element 620, a third lens element 630, a fourth lens element 640, a fifth lens element 650, a filter 660 and an image surface 670, wherein the optical imaging lens assembly has a total of five non-cemented lens elements (610-650) with refractive power. There is an air gap in a paraxial region between every two of the first lens element 610, the second lens element 620, the third lens element 630, the fourth lens element 640 and the fifth lens element 650 that are adjacent to each other.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with positive refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric. The object-side surface 641 of the fourth lens element 640 has at least one inflection point in an off-axis region thereof.

The fifth lens element 650 with negative refractive power has an object-side surface 651 being concave in a paraxial region thereof and an image-side surface 652 being concave in a paraxial region thereof. The fifth lens element 650 is made of plastic material and has the object-side surface 651 and the image-side surface 652 being both aspheric. The image-side surface 652 of the fifth lens element 650 has at least one convex shape in an off-axis region thereof.

The filter 660 is made of glass and located between the fifth lens element 650 and the image surface 670, and will not affect the focal length of the optical imaging lens assembly. The image sensor 680 is disposed on or near the image surface 670 of the optical imaging lens assembly.

The detailed optical data of the 6th embodiment are shown in Table 11 and the aspheric surface data are shown in Table 12 below.

TABLE 11

6th Embodiment
f = 5.31 mm, Fno = 1.30, HFOV = 30.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.800 | | | | |
| 2 | Lens 1 | 2.527 (ASP) | 1.731 | Plastic | 1.537 | 55.9 | 7.92 |
| 3 | | 4.740 (ASP) | 0.432 | | | | |
| 4 | Lens 2 | 2.130 (ASP) | 0.391 | Plastic | 1.620 | 23.5 | 32.14 |
| 5 | | 2.218 (ASP) | 0.464 | | | | |
| 6 | Lens 3 | 30.370 (ASP) | 0.895 | Plastic | 1.527 | 55.7 | −14.46 |
| 7 | | 6.032 (ASP) | 0.078 | | | | |
| 8 | Lens 4 | 3.904 (ASP) | 0.994 | Plastic | 1.527 | 55.7 | 2.65 |
| 9 | | −1.988 (ASP) | 0.265 | | | | |
| 10 | Lens 5 | −3.234 (ASP) | 0.350 | Plastic | 1.527 | 55.7 | −2.57 |
| 11 | | 2.417 (ASP) | 0.500 | | | | |
| 12 | Filter | Plano | 0.400 | Glass | 1.510 | 64.2 | — |
| 13 | | Plano | 0.351 | | | | |
| 14 | Image | Plano | — | | | | |

Note:
Reference wavelength is 850 nm.
Effective radius of surface 10 is 2.320 mm.

TABLE 12

Aspheric Coefficients

| | Surface # | | | | |
|---|---|---|---|---|---|
| | 2 | 3 | 4 | 5 | 6 |
| k = | −3.2616E+00 | 2.3877E+00 | −4.6210E+00 | −4.8931E+00 | −9.0000E+01 |
| A4 = | 2.1288E−02 | −2.5826E−02 | 8.9361E−03 | 3.5778E−02 | −6.4857E−03 |
| A6 = | −6.2605E−04 | 3.1814E−04 | −1.0458E−02 | −2.2713E−02 | −1.2116E−02 |
| A8 = | −1.3207E−03 | 4.3742E−04 | −1.2583E−02 | 5.2373E−03 | 3.6923E−02 |
| A10 = | 8.7225E−04 | −6.6642E−04 | 4.5993E−03 | −9.7631E−03 | −3.5593E−02 |
| A12 = | −2.7538E−04 | 2.3686E−04 | 3.4915E−04 | 8.7511E−03 | 1.8411E−02 |
| A14 = | 4.4241E−05 | −3.7273E−05 | −2.4446E−04 | −3.0185E−03 | −5.0826E−03 |
| A16 = | −3.1258E−06 | 2.1967E−06 | 1.8305E−05 | 3.9506E−04 | 5.7930E−04 |

| | Surface # | | | | |
|---|---|---|---|---|---|
| | 7 | 8 | 9 | 10 | 11 |
| k = | 1.0015E+01 | −7.9487E+01 | −1.6385E+01 | −8.2048E+01 | −2.7271E−01 |
| A4 = | −6.0223E−02 | 1.0593E−01 | 1.8302E−03 | −7.8955E−02 | −1.3075E−01 |
| A6 = | −1.0609E−02 | −1.5454E−01 | 5.7251E−02 | 2.6397E−02 | 4.3029E−02 |

TABLE 12-continued

| Aspheric Coefficients | | | | | |
|---|---|---|---|---|---|
| A8 = | −7.7909E−03 | 1.2604E−01 | −4.7779E−02 | −4.0048E−03 | −1.1527E−02 |
| A10 = | 1.2615E−02 | −8.0782E−02 | 1.7779E−02 | 3.0647E−04 | 1.9148E−03 |
| A12 = | −5.4888E−03 | 3.2600E−02 | −3.6926E−03 | −2.4941E−05 | −1.8179E−04 |
| A14 = | 1.0475E−03 | −7.2817E−03 | 4.1566E−04 | 5.4479E−06 | 8.3117E−06 |
| A16 = | −8.3290E−05 | 6.7758E−04 | −1.9508E−05 | −4.3820E−07 | −1.3315E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 5.31 | CT1/(CT2 + CT4 + CT5) | 1.00 |
| Fno | 1.30 | FPCT [mm] | 0.400 |
| HFOV [deg.] | 30.8 | EPD/CT2 | 10.45 |
| V2 | 23.5 | f1/f2 | 0.25 |
| \|(R3 + R4)/(R3 − R4)\| | 49.63 | (\|f4\| + \|f5\|)/\|f1\| | 0.66 |
| (f/R7) + (f/R8) | −1.31 | TL/EPD | 1.68 |
| CT3/CT2 | 2.29 | BL/TL | 0.18 |

7th Embodiment

Figure 13:
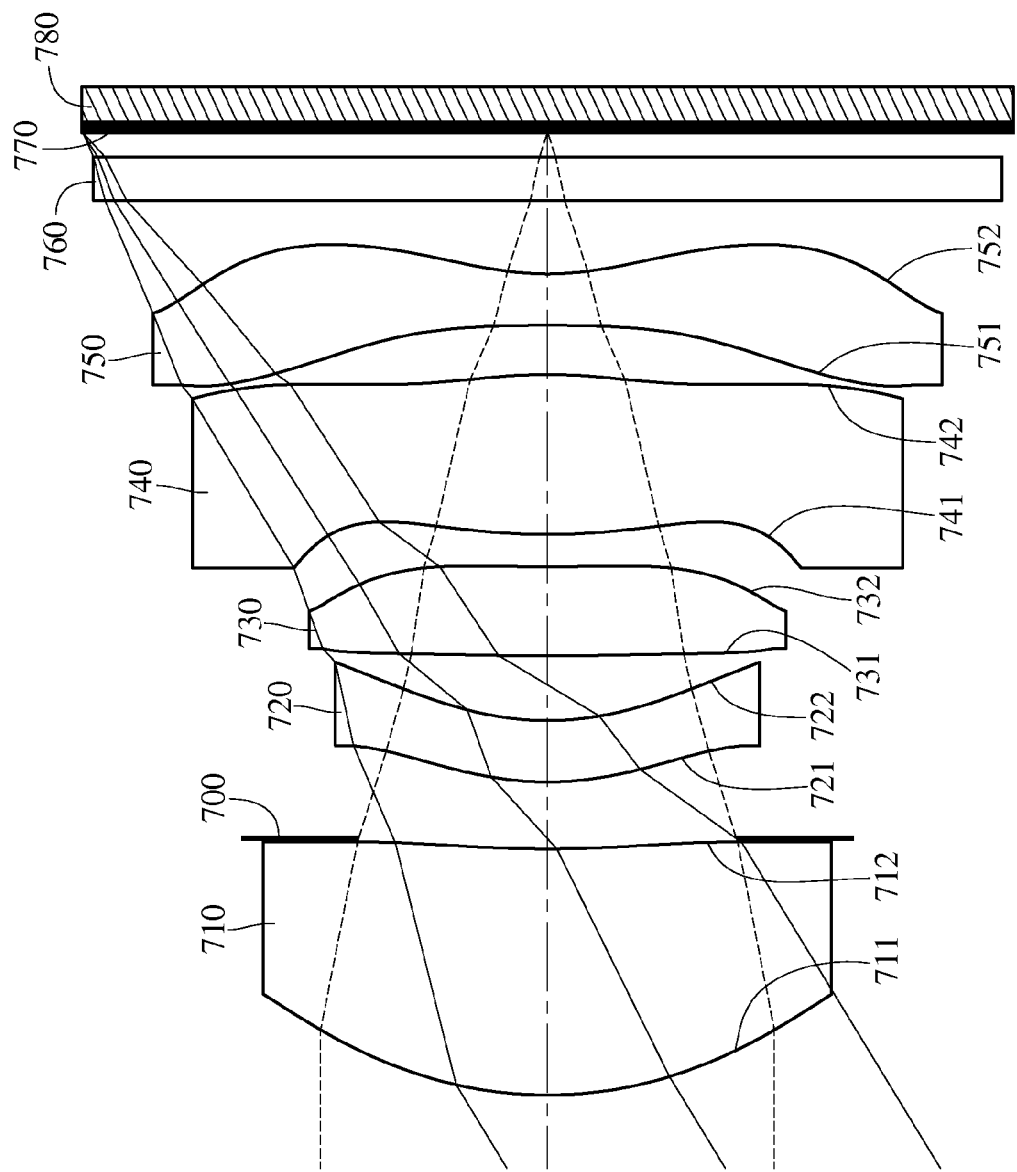
FIG. 13 is a schematic view of an image capturing unit according to the 7th embodiment of the present disclosure.
Figure 14:
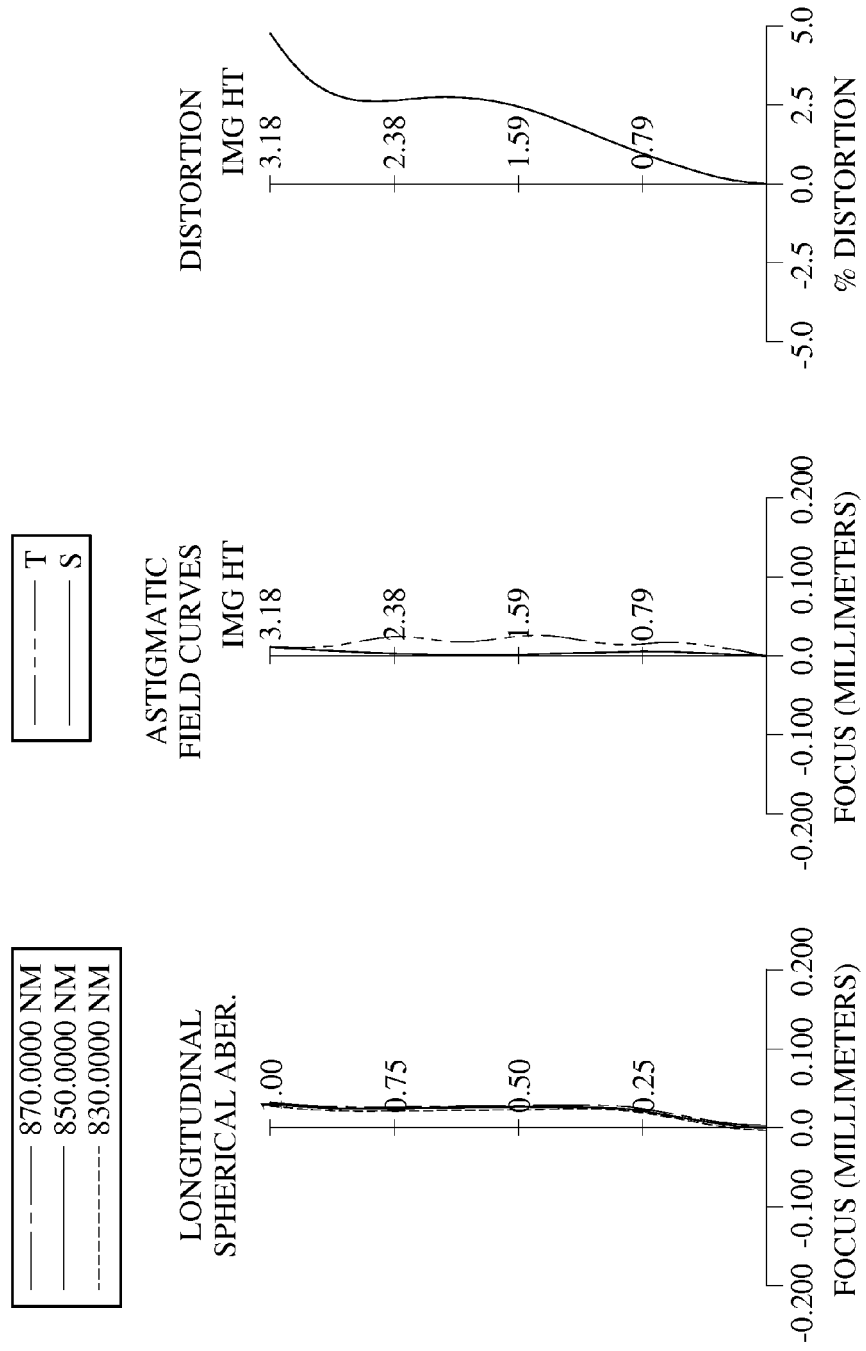
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging lens assembly (its reference numeral is omitted) of the present disclosure and an image sensor 780. The optical imaging lens assembly includes, in order from an object side to an image side, a first lens element 710, an aperture stop 700, a second lens element 720, a third lens element 730, a fourth lens element 740, a fifth lens element 750, a filter 760 and an image surface 770, wherein the optical imaging lens assembly has a total of five non-cemented lens elements (710-750) with refractive power. There is an air gap in a paraxial region between every two of the first lens element 710, the second lens element 720, the third lens element 730, the fourth lens element 740 and the fifth lens element 750 that are adjacent to each other.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with positive refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric. The object-side surface 741 of the fourth lens element 740 has at least one inflection point in an off-axis region thereof.

The fifth lens element 750 with negative refractive power has an object-side surface 751 being concave in a paraxial region thereof and an image-side surface 752 being concave in a paraxial region thereof. The fifth lens element 750 is made of plastic material and has the object-side surface 751 and the image-side surface 752 being both aspheric. The image-side surface 752 of the fifth lens element 750 has at least one convex shape in an off-axis region thereof.

The filter 760 is made of glass and located between the fifth lens element 750 and the image surface 770, and will not affect the focal length of the optical imaging lens assembly. The image sensor 780 is disposed on or near the image surface 770 of the optical imaging lens assembly.

The detailed optical data of the 7th embodiment are shown in Table 13 and the aspheric surface data are shown in Table 14 below.

TABLE 13

7th Embodiment
f = 4.96 mm, Fno = 1.60, HFOV = 31.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.772 (ASP) | 1.683 | Plastic | 1.537 | 55.9 | 7.16 |
| 2 | | 7.838 (ASP) | 0.070 | | | | |
| 3 | Ape. Stop | Plano | 0.387 | | | | |
| 4 | Lens 2 | 2.145 (ASP) | 0.420 | Plastic | 1.620 | 23.5 | 165.22 |
| 5 | | 2.027 (ASP) | 0.442 | | | | |
| 6 | Lens 3 | 16.391 (ASP) | 0.609 | Plastic | 1.527 | 55.7 | −122.72 |

TABLE 13-continued

7th Embodiment
f = 4.96 mm, Fno = 1.60, HFOV = 31.3 deg.

| Surface # | | Curvature Radius | Thickness | Material | Index | Abbe # | Focal Length |
|---|---|---|---|---|---|---|---|
| 7 | | 12.911 (ASP) | 0.221 | | | | |
| 8 | Lens 4 | 4.403 (ASP) | 1.093 | Plastic | 1.527 | 55.7 | 3.70 |
| 9 | | −3.207 (ASP) | 0.337 | | | | |
| 10 | Lens 5 | −9.364 (ASP) | 0.350 | Plastic | 1.527 | 55.7 | −3.05 |
| 11 | | 1.963 (ASP) | 0.500 | | | | |
| 12 | Filter | Plano | 0.300 | Glass | 1.510 | 64.2 | — |
| 13 | | Plano | 0.164 | | | | |
| 14 | Image | Plano | — | | | | |

Note:
Reference wavelength is 850 nm.
Effective radius of surface 10 is 2.500 mm.

TABLE 14

Aspheric Coefficients

| | Surface # | | | | |
|---|---|---|---|---|---|
| | 1 | 2 | 4 | 5 | 6 |
| k = | −3.1498E+00 | −8.1059E+00 | −4.2878E+00 | −3.6959E+00 | −9.0000E+01 |
| A4 = | 1.5728E−02 | −1.8954E−02 | −1.8859E−03 | 2.3201E−02 | −2.6070E−02 |
| A6 = | −2.1945E−03 | −2.0771E−02 | −4.9856E−03 | −1.3212E−02 | 2.1218E−02 |
| A8 = | 4.4014E−04 | 5.4103E−02 | −2.0950E−02 | −9.4716E−03 | −1.4062E−02 |
| A10 = | −8.1960E−05 | −6.5808E−02 | 1.6838E−02 | 9.1437E−03 | 9.4247E−03 |
| A12 = | −8.1626E−06 | 4.3681E−02 | −5.6891E−03 | −2.5769E−03 | −4.8108E−03 |
| A14 = | 4.1609E−06 | −1.5123E−02 | 6.0858E−04 | 2.0708E−04 | 1.4715E−03 |
| A16 = | −5.6404E−07 | 2.1352E−03 | 6.5062E−05 | 1.7128E−05 | −1.7425E−04 |

| | Surface # | | | | |
|---|---|---|---|---|---|
| | 7 | 8 | 9 | 10 | 11 |
| k = | 1.0454E+01 | −7.9485E+01 | −1.4725E+01 | −1.0000E+00 | −5.4645E−01 |
| A4 = | −6.8957E−02 | 8.7115E−02 | 8.7197E−02 | −5.1250E−03 | −1.4261E−01 |
| A6 = | −1.3791E−02 | −1.4591E−01 | −3.6469E−02 | −4.1257E−02 | 5.0095E−02 |
| A8 = | 2.2784E−02 | 1.2418E−01 | 5.8942E−03 | 3.0282E−02 | −1.6730E−02 |
| A10 = | −1.9531E−02 | −7.9295E−02 | 2.9795E−04 | −9.5246E−03 | 4.0015E−03 |
| A12 = | 1.1043E−02 | 3.1397E−02 | −2.8640E−04 | 1.5802E−03 | −6.3232E−04 |
| A14 = | −3.4688E−03 | −6.8934E−03 | 4.3633E−05 | −1.3476E−04 | 5.6392E−05 |
| A16 = | 4.5836E−04 | 6.3643E−04 | −2.2468E−06 | 4.6566E−06 | −2.0975E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 4.96 | CT1/(CT2 + CT4 + CT5) | 0.90 |
| Fno | 1.60 | FPCT [mm] | 0.300 |
| HFOV [deg.] | 31.3 | EPD/CT2 | 7.38 |
| V2 | 23.5 | f1/f2 | 0.04 |
| |(R3 + R4)/(R3 − R4)| | 35.29 | (|f4| + |f5|)/|f1| | 0.94 |
| (f/R7) + (f/R8) | −0.42 | TL/EPD | 2.12 |
| CT3/CT2 | 1.45 | BL/TL | 0.15 |

8th Embodiment

Figure 15:
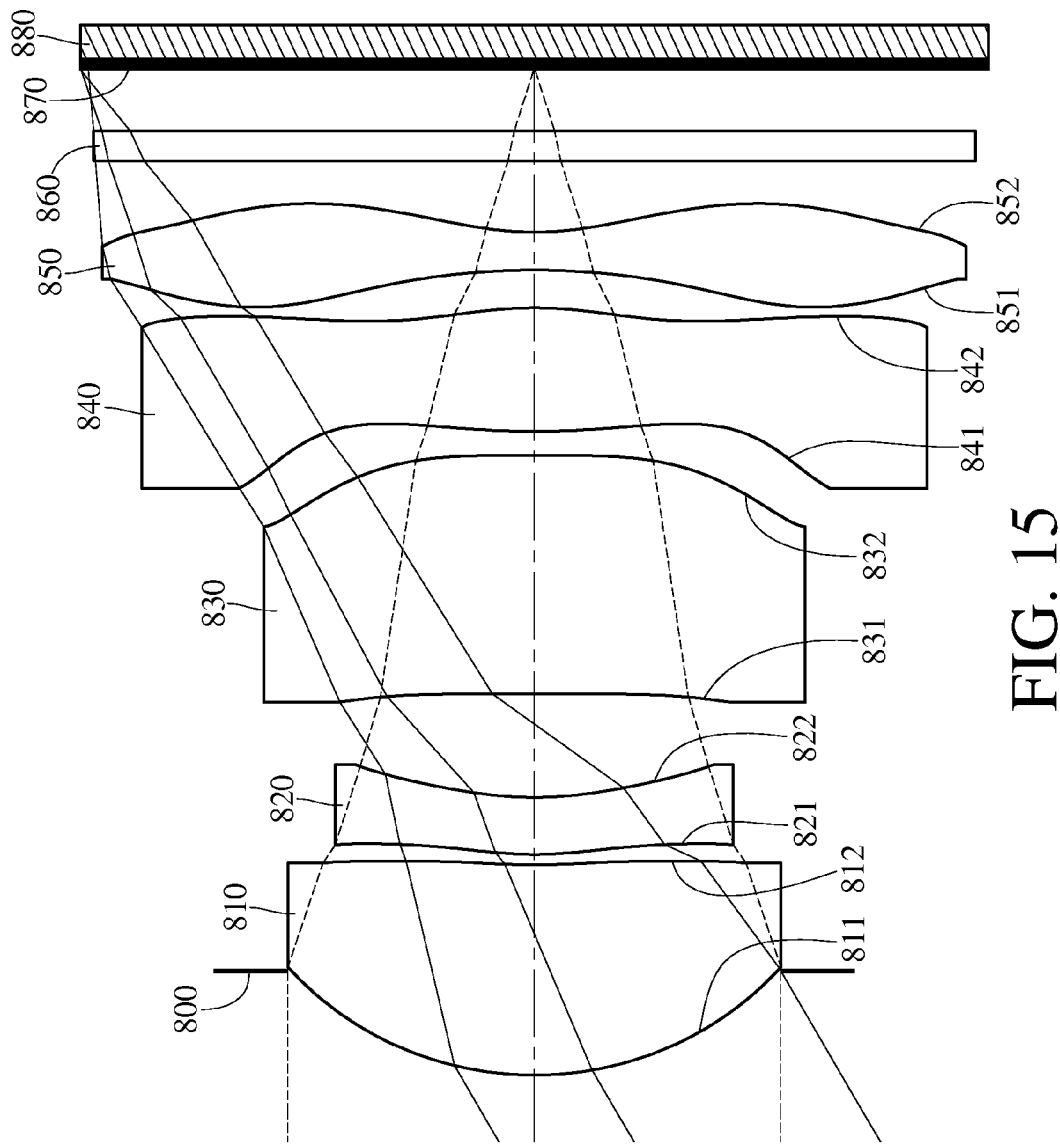
FIG. 15 is a schematic view of an image capturing unit according to the 8th embodiment of the present disclosure.
Figure 16:
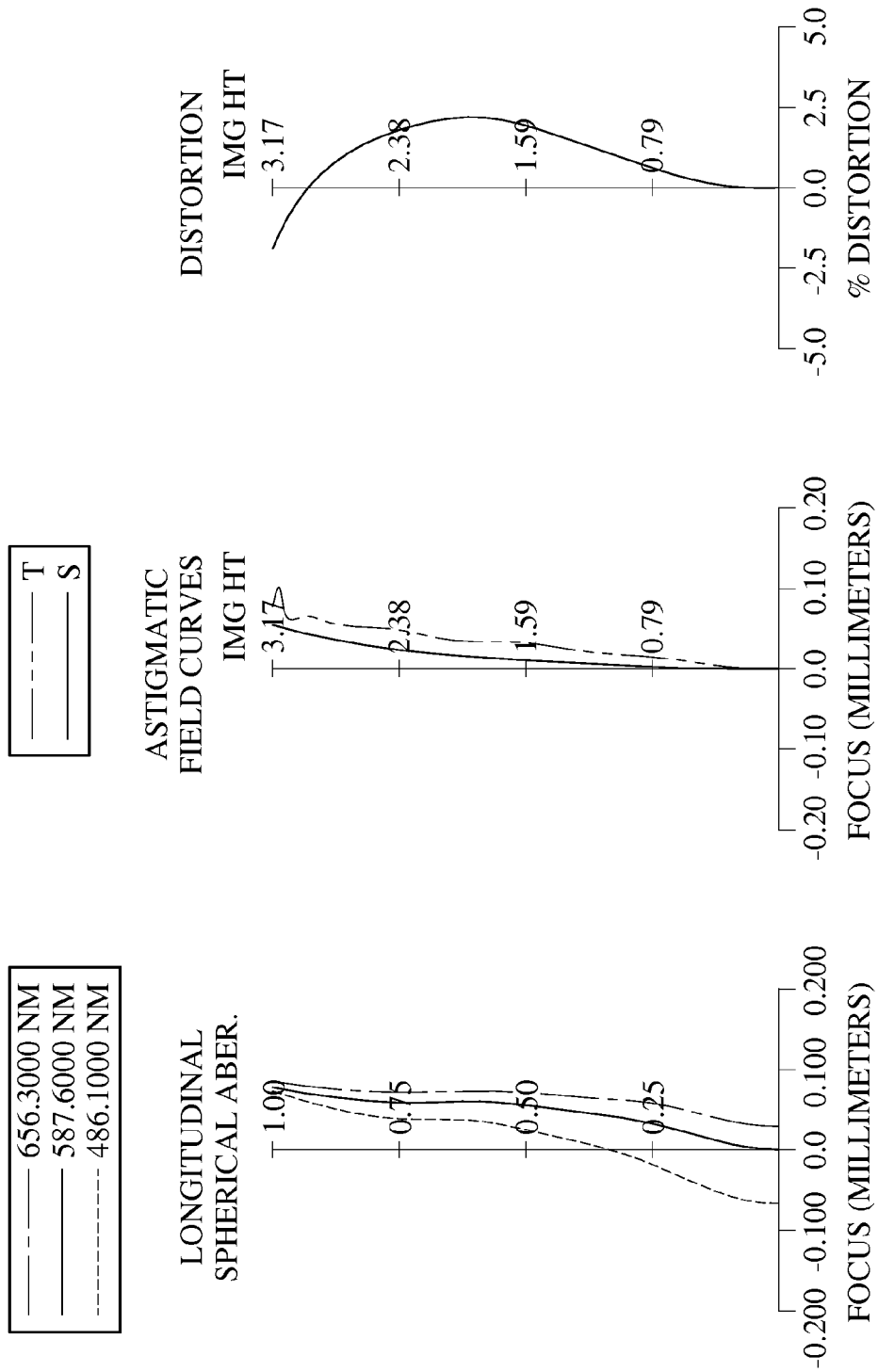
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical imaging lens assembly (its reference numeral is omitted) of the present disclosure and an image sensor 880. The optical imaging lens assembly includes, in order from an object side to an image side, an aperture stop 800, a first lens element 810, a second lens element 820, a third lens element 830, a fourth lens element 840, a fifth lens element 850, a filter 860 and an image surface 870, wherein the optical imaging lens assembly has a total of five non-cemented lens elements (810-850) with refractive power. There is an air gap in a paraxial region between every two of the first lens element 810, the second lens element 820, the third lens element 830, the fourth lens element 840 and the fifth lens element 850 that are adjacent to each other.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with positive refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric.

The fourth lens element 840 with positive refractive power has an object-side surface 841 being convex in a paraxial region thereof and an image-side surface 842 being convex in a paraxial region thereof. The fourth lens element 840 is made of plastic material and has the object-side surface 841 and the image-side surface 842 being both aspheric. The object-side surface 841 of the fourth lens element 840 has at least one inflection point in an off-axis region thereof.

The fifth lens element 850 with negative refractive power has an object-side surface 851 being concave in a paraxial region thereof and an image-side surface 852 being concave in a paraxial region thereof. The fifth lens element 850 is made of plastic material and has the object-side surface 851 and the image-side surface 852 being both aspheric. The image-side surface 852 of the fifth lens element 850 has at least one convex shape in an off-axis region thereof.

The filter 860 is made of glass and located between the fifth lens element 850 and the image surface 870, and will not affect the focal length of the optical imaging lens assembly. The image sensor 880 is disposed on or near the image surface 870 of the optical imaging lens assembly.

The detailed optical data of the 8th embodiment are shown in Table 15 and the aspheric surface data are shown in Table 16 below.

TABLE 15

8th Embodiment
f = 5.52 mm, Fno = 1.60, HFOV = 30.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.730 | | | | |
| 2 | Lens 1 | 2.377 (ASP) | 1.473 | Plastic | 1.530 | 55.8 | 7.90 |
| 3 | | 4.318 (ASP) | 0.073 | | | | |
| 4 | Lens 2 | 2.512 (ASP) | 0.400 | Plastic | 1.634 | 23.8 | 56.10 |
| 5 | | 2.536 (ASP) | 0.725 | | | | |
| 6 | Lens 3 | 96.458 (ASP) | 1.673 | Plastic | 1.541 | 56.0 | 81.70 |
| 7 | | −81.015 (ASP) | 0.167 | | | | |
| 8 | Lens 4 | 5.149 (ASP) | 0.867 | Plastic | 1.566 | 36.8 | 3.08 |
| 9 | | −2.473 (ASP) | 0.265 | | | | |
| 10 | Lens 5 | −4.259 (ASP) | 0.265 | Plastic | 1.608 | 27.9 | −2.29 |
| 11 | | 2.116 (ASP) | 0.500 | | | | |
| 12 | Filter | Plano | 0.210 | Glass | 1.517 | 64.2 | — |
| 13 | | Plano | 0.428 | | | | |
| 14 | Image | Plano | — | | | | |

Note:
Reference wavelength is 587.6 nm (d-line).
Effective radius of surface 9 is 2.750 mm.

TABLE 16

Aspheric Coefficients

| Surface # | | | | |
|---|---|---|---|---|
| 2 | 3 | 4 | 5 | 6 |
| k = −2.1008E+00 | 2.4614E+00 | −1.1350E+01 | −1.9840E+01 | −9.0000E+01 |
| A4 = 1.7000E−02 | −2.1923E−01 | −1.6660E−01 | 6.3579E−02 | −2.2612E−02 |
| A6 = 8.6555E−03 | 2.2811E−01 | 1.2095E−01 | −1.5519E−01 | 6.3921E−03 |
| A8 = −1.2160E−02 | −1.5328E−01 | −1.3759E−02 | 2.3416E−01 | −1.0998E−02 |
| A10 = 9.8040E−03 | 6.3614E−02 | −4.3239E−02 | −2.0149E−01 | 1.1217E−02 |
| A12 = −4.2791E−03 | −1.5134E−02 | 3.2835E−02 | 1.0152E−01 | −6.6512E−03 |
| A14 = 9.7885E−04 | 1.5882E−03 | −1.0083E−02 | −2.7589E−02 | 2.1339E−03 |
| A16 = −9.1589E−05 | −2.1582E−05 | 1.1633E−03 | 3.1668E−03 | −2.5533E−04 |

| Surface # | | | | |
|---|---|---|---|---|
| 7 | 8 | 9 | 10 | 11 |
| k = 9.0000E+01 | −3.9089E+01 | −1.6115E+01 | −8.2829E+01 | −5.4542E−01 |
| A4 = −7.8315E−02 | −1.5534E−02 | 6.1255E−02 | −3.4972E−02 | −1.2860E−01 |
| A6 = 9.1798E−03 | −6.4546E−03 | −7.5242E−03 | 1.9804E−03 | 4.4359E−02 |

TABLE 16-continued

| Aspheric Coefficients |
|---|

| A8 =  | 3.1283E-03  | -1.9506E-03 | -6.3847E-03 | 5.8178E-03  | -1.2954E-02 |
|-------|-------------|-------------|-------------|-------------|-------------|
| A10 = | -1.9429E-03 | 1.6028E-03  | 2.8854E-03  | -1.9736E-03 | 2.4996E-03  |
| A12 = | 5.5527E-04  | -8.8235E-04 | -5.2722E-04 | 2.8565E-04  | -2.9633E-04 |
| A14 = | -9.8921E-05 | 2.4871E-04  | 4.6462E-05  | -1.9988E-05 | 1.9651E-05  |
| A16 = | 1.1447E-05  | -2.3105E-05 | -1.6279E-06 | 5.5228E-07  | -5.6711E-07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 5.52 | CT1/(CT2 + CT4 + CT5) | 0.96 |
| Fno | 1.60 | FPCT [mm] | 0.210 |
| HFOV [deg.] | 30.2 | EPD/CT2 | 8.63 |
| V2 | 23.8 | f1/f2 | 0.14 |
| \|(R3 + R4)/(R3 − R4)\| | 211.30 | (\|f4\| + \|f5\|)/\|f1\| | 0.68 |
| (f/R7) + (f/R8) | -1.16 | TL/EPD | 2.04 |
| CT3/CT2 | 4.18 | BL/TL | 0.16 |

9th Embodiment

Figure 17:
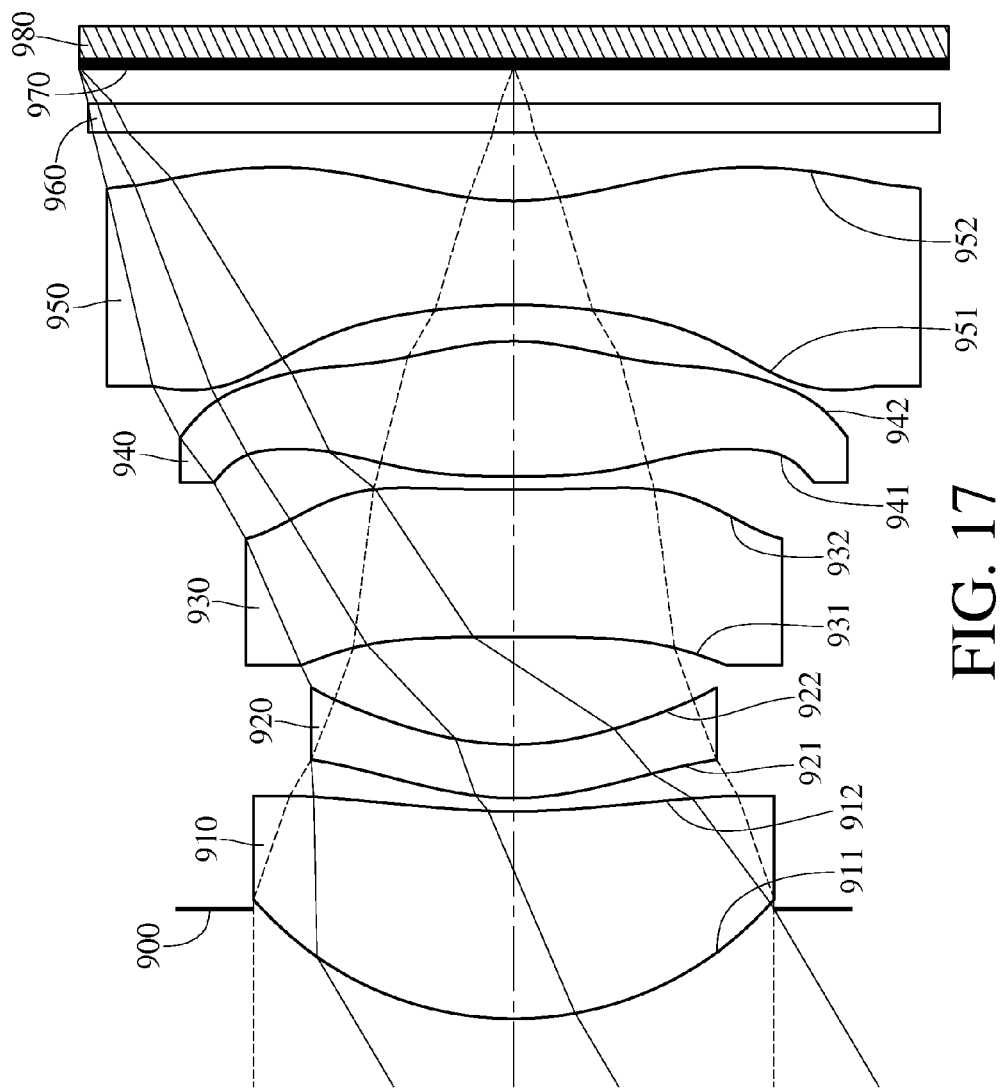
FIG. 17 is a schematic view of an image capturing unit according to the 9th embodiment of the present disclosure.
Figure 18:
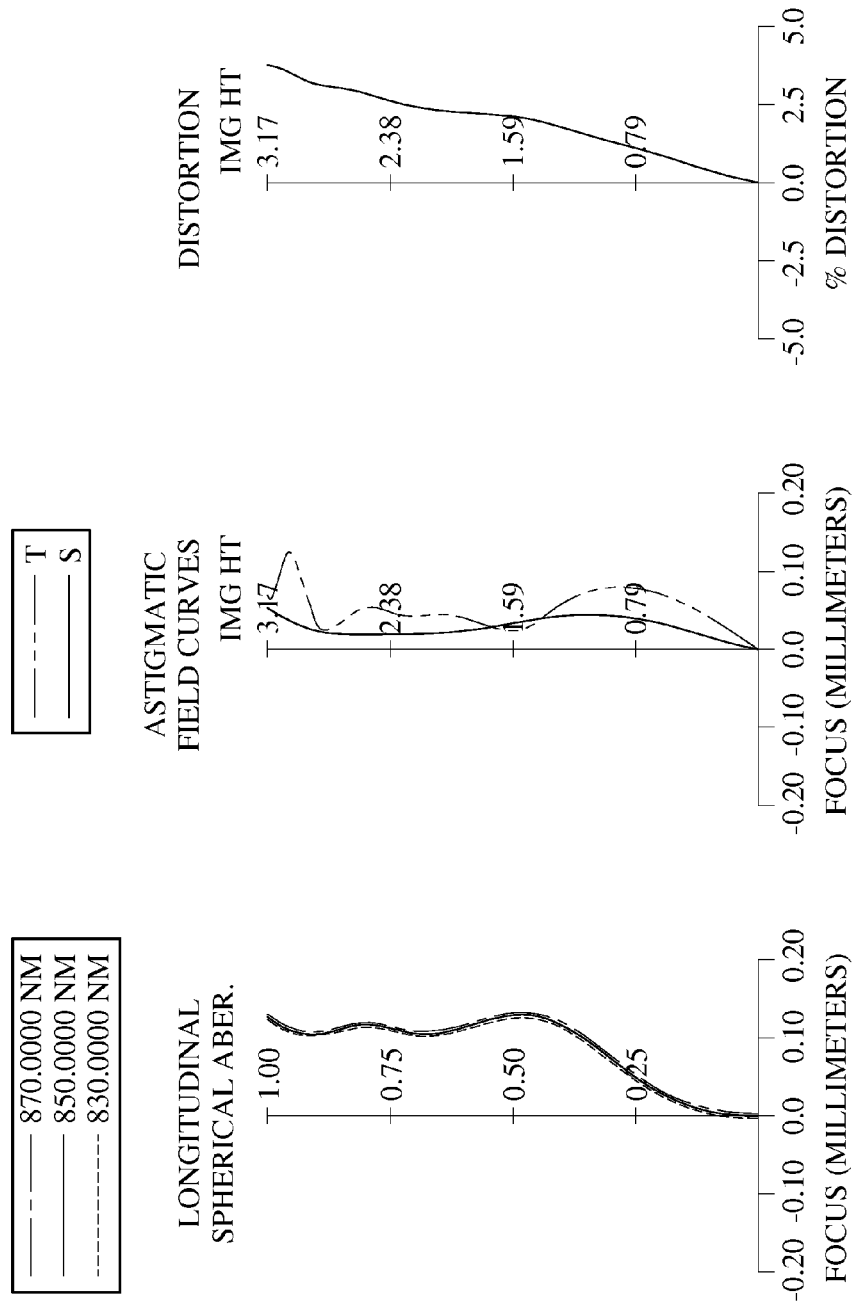
FIG. 18 shows spherical aberration curves, astigmatic field curves and a distortion curve of the image capturing unit according to the 9th embodiment.
Figure 20:
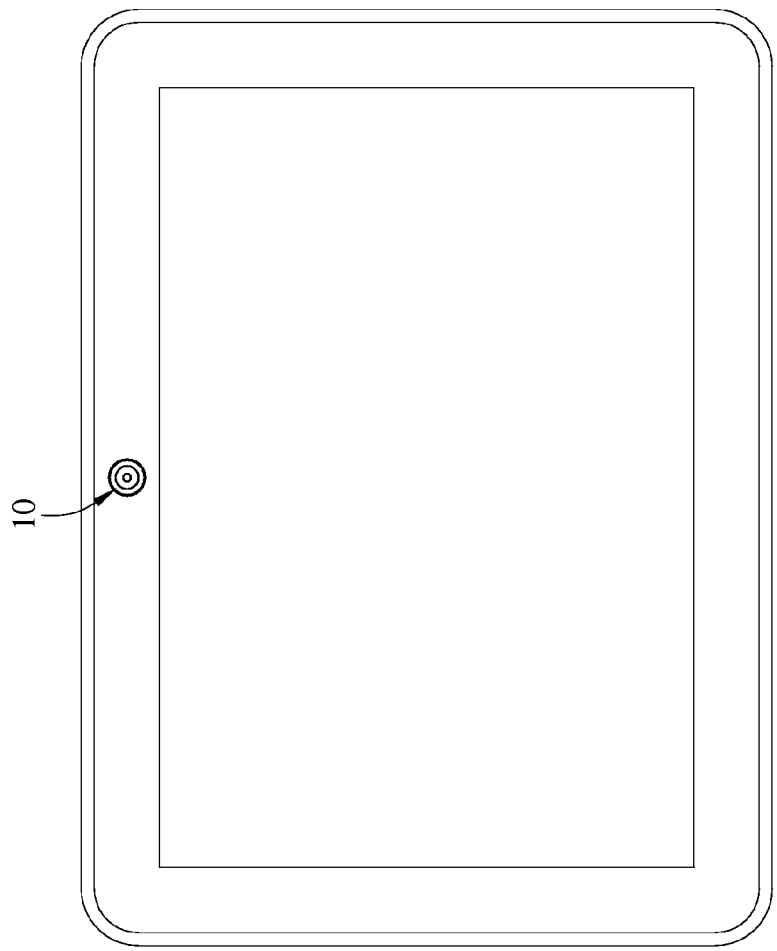
FIG. 20 shows an electronic device according to another embodiment.
Figure 19:
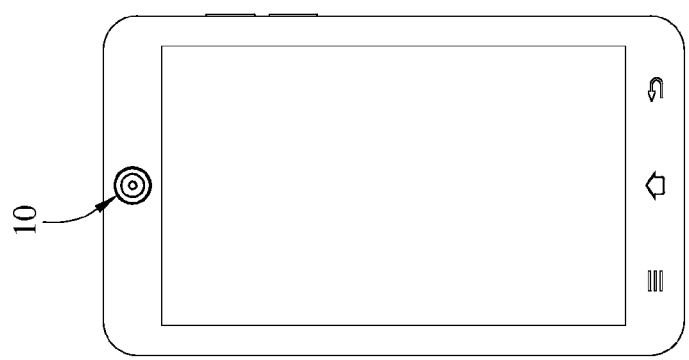
FIG. 19 shows an electronic device according to one embodiment.
Figure 21:
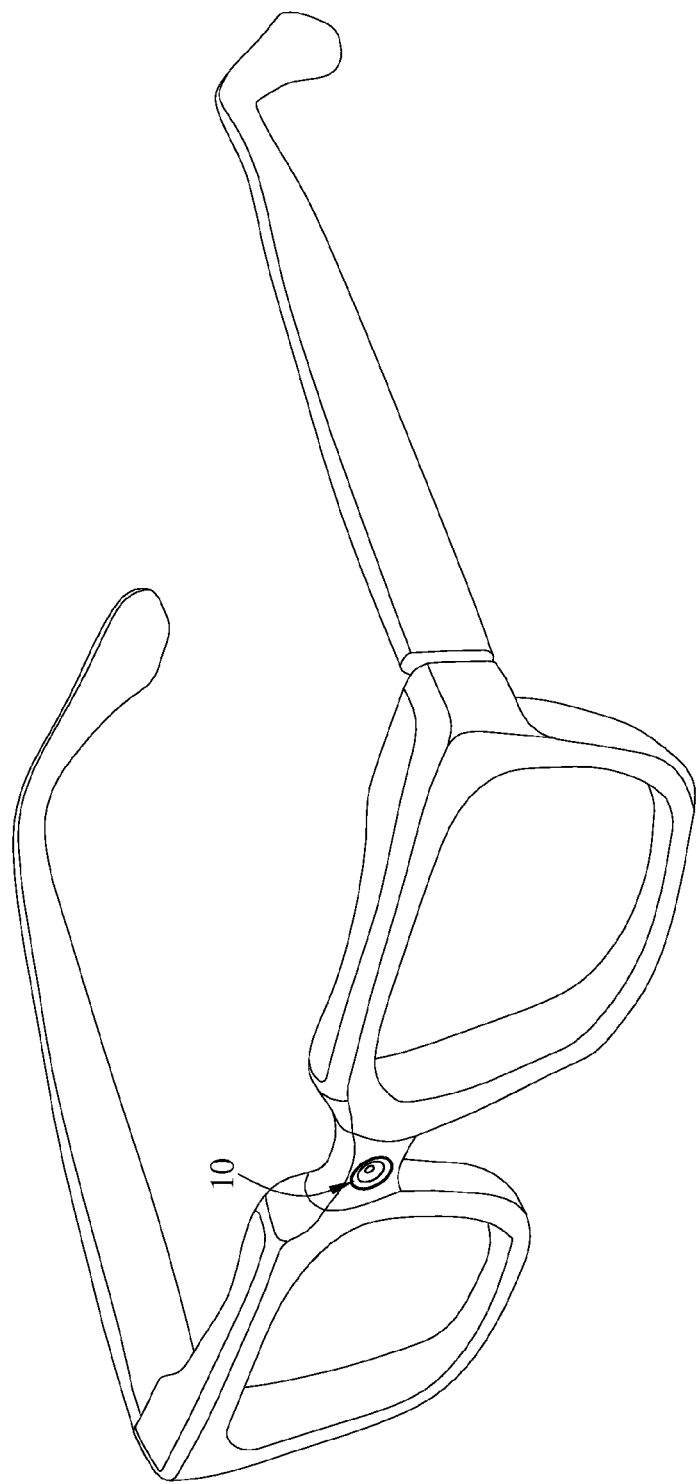
FIG. 21 shows an electronic device according to still another embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical imaging lens assembly (its reference numeral is omitted) of the present disclosure and an image sensor 980. The optical imaging lens assembly includes, in order from an object side to an image side, an aperture stop 900, a first lens element 910, a second lens element 920, a third lens element 930, a fourth lens element 940, a fifth lens element 950, a filter 960 and an image surface 970, wherein the optical imaging lens assembly has a total of five non-cemented lens elements (910-950) with refractive power. There is an air gap in a paraxial region between every two of the first lens element 910, the second lens element 920, the third lens element 930, the fourth lens element 940 and the fifth lens element 950 that are adjacent to each other.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with positive refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric.

The third lens element 930 with negative refractive power has an object-side surface 931 being concave in a paraxial region thereof and an image-side surface 932 being convex in a paraxial region thereof. The third lens element 930 is made of plastic material and has the object-side surface 931 and the image-side surface 932 being both aspheric.

The fourth lens element 940 with positive refractive power has an object-side surface 941 being convex in a paraxial region thereof and an image-side surface 942 being convex in a paraxial region thereof. The fourth lens element 940 is made of plastic material and has the object-side surface 941 and the image-side surface 942 being both aspheric. The object-side surface 941 of the fourth lens element 940 has at least one inflection point in an off-axis region thereof.

The fifth lens element 950 with negative refractive power has an object-side surface 951 being concave in a paraxial region thereof and an image-side surface 952 being concave in a paraxial region thereof. The fifth lens element 950 is made of plastic material and has the object-side surface 951 and the image-side surface 952 being both aspheric. The image-side surface 952 of the fifth lens element 950 has at least one convex shape in an off-axis region thereof.

The filter 960 is made of glass and located between the fifth lens element 950 and the image surface 970, and will not affect the focal length of the optical imaging lens assembly. The image sensor 980 is disposed on or near the image surface 970 of the optical imaging lens assembly.

The detailed optical data of the 9th embodiment are shown in Table 17 and the aspheric surface data are shown in Table 18 below.

TABLE 17

| 9th Embodiment f = 5.09 mm, Fno = 1.34, HFOV = 30.5 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Ape. Stop | Plano | -0.800 | | | | |
| 2 | Lens 1 | 2.524 (ASP) | 1.515 | Plastic | 1.537 | 55.9 | 8.13 |
| 3 | | 4.730 (ASP) | 0.098 | | | | |
| 4 | Lens 2 | 2.125 (ASP) | 0.391 | Plastic | 1.620 | 23.5 | 31.95 |
| 5 | | 2.213 (ASP) | 0.787 | | | | |
| 6 | Lens 3 | -51.694 (ASP) | 1.080 | Plastic | 1.527 | 55.7 | -510.62 |

TABLE 17-continued

9th Embodiment
f = 5.09 mm, Fno = 1.34, HFOV = 30.5 deg.

| Surface # | | Curvature Radius | Thickness | Material | Index | Abbe # | Focal Length |
|---|---|---|---|---|---|---|---|
| 7 | | −64.437 (ASP) | 0.093 | | | | |
| 8 | Lens 4 | 14.678 (ASP) | 0.988 | Plastic | 1.527 | 55.7 | 3.07 |
| 9 | | −1.780 (ASP) | 0.265 | | | | |
| 10 | Lens 5 | −3.789 (ASP) | 0.761 | Plastic | 1.527 | 55.7 | −2.51 |
| 11 | | 2.178 (ASP) | 0.500 | | | | |
| 12 | Filter | Plano | 0.210 | Glass | 1.510 | 64.2 | — |
| 13 | | Plano | 0.251 | | | | |
| 14 | Image | Plano | — | | | | |

Note:
Reference wavelength is 850 nm.
Effective radius of surface 11 is 2.970 mm.

TABLE 18

Aspheric Coefficients

| | Surface # | | | | |
|---|---|---|---|---|---|
| | 2 | 3 | 4 | 5 | 6 |
| k = | −2.5248E+00 | 4.6255E+00 | −3.9322E+00 | −1.0954E+01 | 2.0000E+01 |
| A4 = | 2.0864E−02 | −7.2859E−02 | −3.7434E−02 | 9.3992E−02 | −4.7087E−02 |
| A6 = | −4.6964E−03 | 4.2474E−02 | 2.7607E−03 | −1.0330E−01 | 4.3505E−02 |
| A8 = | 5.4524E−03 | −2.0222E−02 | 1.6733E−02 | 7.6195E−02 | −7.1116E−02 |
| A10 = | −2.9531E−03 | 5.7903E−03 | −2.0760E−02 | −3.9783E−02 | 6.2992E−02 |
| A12 = | 7.9809E−04 | −9.6450E−04 | 1.1190E−02 | 1.4617E−02 | −3.1851E−02 |
| A14 = | −9.3135E−05 | 6.3257E−05 | −2.8952E−03 | −3.2325E−03 | 8.7172E−03 |
| A16 = | 2.6713E−06 | −1.6303E−06 | 2.8747E−04 | 3.3052E−04 | −9.8108E−04 |

| | Surface # | | | | |
|---|---|---|---|---|---|
| | 7 | 8 | 9 | 10 | 11 |
| k = | 9.0000E+01 | −5.2218E+01 | −1.6068E+01 | −9.0000E+01 | −5.1117E−01 |
| A4 = | 1.1566E−01 | 1.6423E−01 | −6.9133E−02 | −5.4566E−02 | −1.0946E−01 |
| A6 = | −1.7255E−01 | −1.3734E−01 | 1.5409E−01 | 2.9719E−02 | 4.2180E−02 |
| A8 = | 8.5062E−02 | 6.5480E−02 | −1.0109E−01 | −1.9377E−02 | −1.5686E−02 |
| A10 = | −2.3767E−02 | −2.4799E−02 | 3.1564E−02 | 6.7369E−03 | 3.7821E−03 |
| A12 = | 4.2325E−03 | 6.7083E−03 | −5.1816E−03 | −1.1439E−03 | −5.3369E−04 |
| A14 = | −4.4326E−04 | −1.0278E−03 | 4.2672E−04 | 9.4003E−05 | 3.9926E−05 |
| A16 = | 2.0452E−05 | 6.3692E−05 | −1.3768E−05 | −3.0202E−06 | −1.2268E−06 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 5.09 | CT1/(CT2 + CT4 + CT5) | 0.71 |
| Fno | 1.34 | FPCT [mm] | 0.210 |
| HFOV [deg.] | 30.5 | EPD/CT2 | 9.71 |
| V2 | 23.5 | f1/f2 | 0.25 |
| |(R3 + R4)/(R3 − R4)| | 49.32 | (|f4| + |f5|)/|f1| | 0.69 |
| (f/R7) + (f/R8) | −2.51 | TL/EPD | 1.83 |
| CT3/CT2 | 2.76 | BL/TL | 0.14 |

The foregoing image capturing unit is able to be installed in, but not limited to, an electronic device, including smart phones, tablet personal computers and wearable apparatus. According to the present disclosure, the third lens element, the first lens element and the second lens element both have positive refractive powers. Therefore, it is favorable for evenly distributing the light gathering capability of the optical imaging lens assembly so as to reduce the incident angle of the light, thereby avoiding stray light at the peripheral region of the image. Furthermore, it is favorable for reducing the back focal length of the optical imaging lens assembly so as to keep the optical imaging lens assembly compact. When specific conditions are satisfied, it is favorable for providing the second lens element with proper positive refractive power so as to effectively distribute the refractive power of the first lens element and avoid overloading the refractive power on a single lens element, thereby effectively reducing the sensitivity of the optical imaging lens assembly. Moreover, it is favorable for avoiding surface reflection problem caused by excessive change of shape of the fourth lens element and reducing molding problems.

The foregoing description, for the purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising, in order from an object side to an image side:
    a first lens element with positive refractive power having an object-side surface being convex in a paraxial region thereof;
    a second lens element with positive refractive power having an object-side surface being convex in a paraxial region thereof and an image-side surface being concave in a paraxial region thereof;
    a third lens element;
    a fourth lens element with positive refractive power having an object-side surface being convex in a paraxial region thereof and an image-side surface being convex in a paraxial region thereof, wherein both of the object-side surface and the image-side surface of the fourth lens element are aspheric; and
    a fifth lens element with negative refractive power having an object-side surface being concave in a paraxial region thereof and an image-side surface being concave in a paraxial region thereof, wherein the image-side surface of the fifth lens element has at least one convex shape in an off-axis region thereof, and both of the object-side surface and the image-side surface of the fifth lens element are aspheric;
    wherein the optical imaging lens assembly has a total of five lens elements, an air gap in a paraxial region is between every two of the first lens element, the second lens element, the third lens element, the fourth lens element and the fifth lens element that are adjacent to each other;
    wherein a focal length of the optical imaging lens assembly is f, a focal length of the first lens element is f1, a focal length of the second lens element is f2, a curvature radius of the object-side surface of the fourth lens element is R7, a curvature radius of the image-side surface of the fourth lens element is R8, and the following conditions are satisfied:

$0 < f1/f2 < 2.0$; and $-3.0 < (f/R7) + (f/R8)$.

2. The optical imaging lens assembly of claim 1, wherein the focal length of the first lens element is f1, the focal length of the second lens element is f2, and the following condition is satisfied:

$0 < f1/f2 < 1.5$.

3. The optical imaging lens assembly of claim 2, wherein a curvature radius of the object-side surface of the second lens element is R3, a curvature radius of the image-side surface of the second lens element is R4, and the following condition is satisfied:

$8.0 < |(R3+R4)/(R3-R4)|$.

4. The optical imaging lens assembly of claim 2, wherein an entrance pupil diameter of the optical imaging lens assembly is EPD, a central thickness of the second lens element is CT2, and the following condition is satisfied:

$8.0 < EPD/CT2$.

5. The optical imaging lens assembly of claim 2, wherein the focal length of the optical imaging lens assembly is f, the curvature radius of the object-side surface of the fourth lens element is R7, the curvature radius of the image-side surface of the fourth lens element is R8, and the following condition is satisfied:

$-2.0 < (f/R7) + (f/R8)$.

6. The optical imaging lens assembly of claim 5, wherein the focal length of the first lens element is f1, a focal length of the fourth lens element is f4, a focal length of the fifth lens element is f5, and the following condition is satisfied:

$(|f4|+|f5|)/|f1| < 1.25$.

7. The optical imaging lens assembly of claim 5, wherein a central thickness of the second lens element is CT2, a central thickness of the third lens element is CT3, and the following condition is satisfied:

$2.0 < CT3/CT2$.

8. The optical imaging lens assembly of claim 1, wherein an Abbe number of the second lens element is V2, and the following condition is satisfied:

$V2 < 30$.

9. The optical imaging lens assembly of claim 8, further comprising at least one transparent flat panel, wherein the at least one transparent flat panel is located between the image-side surface of the fifth lens element and an image surface, a sum of at least one central thickness of the at least one transparent flat panel is FPCT, and the following condition is satisfied:

$FPCT \leq 0.275$ mm.

10. The optical imaging lens assembly of claim 8, wherein a central thickness of the first lens element is CT1, a central thickness of the second lens element is CT2, a central thickness of the fourth lens element is CT4, a central thickness of the fifth lens element is CT5, and the following condition is satisfied:

$0.85 < CT1/(CT2+CT4+CT5) < 1.25$.

11. The optical imaging lens assembly of claim 8, wherein the object-side surface of the fourth lens element has at least one inflection point in an off-axis region thereof.

12. The optical imaging lens assembly of claim 1, wherein the focal length of the optical imaging lens assembly is f, the curvature radius of the object-side surface of the fourth lens element is R7, the curvature radius of the image-side surface of the fourth lens element is R8, and the following condition is satisfied:

$-1.5 < (f/R7) + (f/R8) < -0.25$.

13. The optical imaging lens assembly of claim 1, wherein an f-number of the optical imaging lens assembly is Fno, and the following condition is satisfied:

$Fno < 1.75$.

14. The optical imaging lens assembly of claim 1, wherein an axial distance between the image-side surface of the fifth lens element and an image surface is BL, an axial distance between the object-side surface of the first lens element and the image surface is TL, and the following condition is satisfied:

$BL/TL<0.18.$

15. The optical imaging lens assembly of claim 1, wherein the optical imaging lens assembly is for being operated within a wavelength range of 750 nanometers (nm) to 1050 nm.

16. An image capturing unit, comprising:
the optical imaging lens assembly of claim 1; and
an image sensor, wherein the image sensor is disposed on the image side of the optical imaging lens assembly.

17. An electronic device, comprising:
the image capturing unit of claim 16.

18. An optical imaging lens assembly comprising, in order from an object side to an image side:
a first lens element with positive refractive power having an object-side surface being convex in a paraxial region thereof;
a second lens element with positive refractive power having an object-side surface being convex in a paraxial region thereof;
a third lens element;
a fourth lens element with positive refractive power having an object-side surface being convex in a paraxial region thereof and an image-side surface being convex in a paraxial region thereof, wherein both of the object-side surface and the image-side surface of the fourth lens element are aspheric; and
a fifth lens element with negative refractive power having an object-side surface being concave in a paraxial region thereof and an image-side surface being concave in a paraxial region thereof, wherein the image-side surface of the fifth lens element has at least one convex shape in an off-axis region thereof, and both of the object-side surface and the image-side surface of the fifth lens element are aspheric;
wherein the optical imaging lens assembly has a total of five lens elements, an air gap in a paraxial region is between every two of the first lens element, the second lens element, the third lens element, the fourth lens element and the fifth lens element that are adjacent to each other;
wherein a focal length of the first lens element is f1, a focal length of the second lens element is f2, an f-number of the optical imaging lens assembly is Fno, and the following conditions are satisfied:

$0<f1/f2<1.5;$ and $Fno<1.75.$

19. The optical imaging lens assembly of claim 18, wherein the focal length of the first lens element is f1, a focal length of the fourth lens element is f4, a focal length of the fifth lens element is f5, and the following condition is satisfied:

$(|f4|+|f5|)/|f1|<1.0.$

20. The optical imaging lens assembly of claim 18, wherein a focal length of the optical imaging lens assembly is f, a curvature radius of the object-side surface of the fourth lens element is R7, a curvature radius of the image-side surface of the fourth lens element is R8, and the following condition is satisfied:

$-1.65<(f/R7)+(f/R8).$

21. The optical imaging lens assembly of claim 18, wherein an axial distance between the object-side surface of the first lens element and an image surface is TL, an entrance pupil diameter of the optical imaging lens assembly is EPD, and the following condition is satisfied:

$TL/EPD<2.0.$

22. The optical imaging lens assembly of claim 18, wherein an Abbe number of the second lens element is V2, and the following condition is satisfied:

$V2<30.$

23. The optical imaging lens assembly of claim 18, wherein a curvature radius of the object-side surface of the second lens element is R3, a curvature radius of an image-side surface of the second lens element is R4, and the following condition is satisfied:

$8.0<|(R3+R4)/(R3-R4)|.$

24. The optical imaging lens assembly of claim 18, wherein the optical imaging lens assembly is for being operated within a wavelength range of 750 nm to 1050 nm.

25. An image capturing unit, comprising:
the optical imaging lens assembly of claim 18; and
an image sensor, wherein the image sensor is disposed on the image side of the optical imaging lens assembly.

26. An electronic device, comprising:
the image capturing unit of claim 25.

27. An optical imaging lens assembly comprising, in order from an object side to an image side:
a first lens element with positive refractive power having an object-side surface being convex in a paraxial region thereof;
a second lens element with positive refractive power having an object-side surface being convex in a paraxial region thereof and an image-side surface being concave in a paraxial region thereof;
a third lens element;
a fourth lens element with positive refractive power having an object-side surface being convex in a paraxial region thereof and an image-side surface being convex in a paraxial region thereof, wherein both of the object-side surface and the image-side surface of the fourth lens element are aspheric; and
a fifth lens element with negative refractive power having an object-side surface being concave in a paraxial region thereof and an image-side surface being concave in a paraxial region thereof, wherein the image-side surface of the fifth lens element has at least one convex shape in an off-axis region thereof, and both of the object-side surface and the image-side surface of the fifth lens element are aspheric;
wherein the optical imaging lens assembly has a total of five lens elements, an air gap in a paraxial region is between every two of the first lens element, the second lens element, the third lens element, the fourth lens element and the fifth lens element that are adjacent to each other;
wherein the optical imaging lens assembly further comprises at least one transparent flat panel located between the image-side surface of the fifth lens element and an image surface, a focal length of the first lens element is f1, a focal length of the second lens element is f2, a sum of at least one central thickness of the at least one transparent flat panel is FPCT, and the following conditions are satisfied:

$0<f1/f2<1.5;$ and $FPCT \leq 0.275$ mm.

* * * * *